US012640574B1

(12) United States Patent
Olsson et al.

(10) Patent No.: US 12,640,574 B1
(45) Date of Patent: May 26, 2026

(54) RECHARGEABLE BATTERY PACK ONBOARD CHARGE STATE INDICATOR

(71) Applicant: SeeScan, Inc., San Diego, CA (US)

(72) Inventors: Mark S. Olsson, La Jolla, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/195,602

(22) Filed: May 10, 2023

Related U.S. Application Data

(63) Continuation of application No. 16/255,524, filed on Jan. 23, 2019, now Pat. No. 11,894,707.

(60) Provisional application No. 62/620,959, filed on Jan. 23, 2018.

(51) Int. Cl.
| | |
|---|---|
| *H02J 7/00* | (2006.01) |
| *G08B 5/38* | (2006.01) |
| *G08B 21/18* | (2006.01) |

(52) U.S. Cl.
CPC .............. *H02J 7/0047* (2013.01); *G08B 5/38* (2013.01); *G08B 21/182* (2013.01); *G08B 21/185* (2013.01); *H02J 7/0045* (2013.01)

(58) Field of Classification Search
None
See application file for complete search history.

(56) References Cited

U.S. PATENT DOCUMENTS

| | | | | |
|---|---|---|---|---|
| 5,603,371 | A * | 2/1997 | Gregg | E06B 9/307 |
| | | | | 160/DIG. 17 |
| 5,635,816 | A * | 6/1997 | Welsh | H02J 7/35 |
| | | | | 320/145 |
| 10,540,867 | B1 * | 1/2020 | Shrikhande | H04L 43/04 |
| 11,894,707 | B1 * | 2/2024 | Olsson | G08B 21/185 |
| 2008/0174269 | A1 * | 7/2008 | DeRome | H02J 7/0049 |
| | | | | 320/112 |
| 2010/0174667 | A1 * | 7/2010 | Vitale | B60L 53/305 |
| | | | | 705/412 |
| 2012/0262093 | A1 * | 10/2012 | Recker | H02J 7/0068 |
| | | | | 315/307 |
| 2014/0097758 | A1 * | 4/2014 | Recker | H05B 47/19 |
| | | | | 315/297 |
| 2014/0292506 | A1 * | 10/2014 | Rapeanu | F21V 23/045 |
| | | | | 340/514 |
| 2015/0077120 | A1 * | 3/2015 | Olsson | G01V 3/02 |
| | | | | 324/326 |
| 2015/0296599 | A1 * | 10/2015 | Recker | H05B 47/16 |
| | | | | 315/153 |

(Continued)

FOREIGN PATENT DOCUMENTS

| | | | | |
|---|---|---|---|---|
| CA | 2168765 | C * | 4/2004 | G01V 15/00 |
| CA | 3007456 | A1 * | 5/2017 | A61D 1/06 |

(Continued)

*Primary Examiner* — Fekadeselassie Girma
(74) *Attorney, Agent, or Firm* — Steven C. Tietsworth, Esq.; Michael J. Pennington, Esq.

(57) ABSTRACT

Battery pack for use with a portable device, including colored LEDs for presenting a high granularity battery charge state, are disclosed. One embodiment includes a red and a green LED, wherein solid and blinking patterns are presented by the LEDs to correspond to a relative battery charge state. Other battery state indications, such as failure states, may also be presented on the colored LEDs.

10 Claims, 15 Drawing Sheets

(56)     References Cited

U.S. PATENT DOCUMENTS

2016/0320005 A1* 11/2016 Nosenkis ............. B65H 75/406
2019/0075665 A1*  3/2019 Choksi ................ H01M 50/244

FOREIGN PATENT DOCUMENTS

GB        2542845 A * 4/2017 ........... A42B 3/0453
JP     2020500396 A * 1/2020 .............. B25H 3/00

* cited by examiner

200

Battery Electronics
(Inside Housing)
230

Battery Cell(s)
(Inside Housing)
220

284 Charge Data Solid
Segment Legend (e.g.,
Colored Green)

Charge Data Flashing
281 Segment Legend
(e.g., Colored Red)

Charge Data Flashing
Segment Legend 282
(e.g., Colored Green)

Charge Data Solid Segment
Legend 283
(e.g., Colored Red)

270-2 e.g., Green LED 270-1 e.g., Red LED 2 or More Lighting
Elements (e.g., LEDs)

210        280
Battery Housing

285

*See Further Fig. 2C Below*

285

270-1    270-2

Green LED    Red LED

280

281
*Ovals Colored In Red*

283
*Shape Colored Red*

100%

284
*Shape Colored Green*

282
*Ovals Colored in Green*

385

*See Further
Fig. 3B Below*

300

200

412

*Mechanical Release Mechanism*
215

214

210
*Battery Housing*

230
*Battery Electronics
(Inside Housing)*

220
*Battery Cell(s)
(Inside Housing)*

1100

1200A

1200B

RECHARGEABLE BATTERY PACK ONBOARD CHARGE STATE INDICATOR

CROSS-REFERENCE TO RELATED APPLICATIONS

This application claims priority to U.S. provisional patent application Ser. No. 62/620,959, filed Jan. 23, 2018 and entitled RECHARGEABLE BATTERY PACK ONBOARD CHARGE STATE INDICATION METHODS AND APPARATUS, the content of which is incorporated by reference herein in its entirety for all purposes.

FIELD

This disclosure relates generally to rechargeable portable battery packs for use with tools and other devices. More specifically, but not exclusively, the disclosure relates to visual indicators on rechargeable battery packs using particular sequences of output lighting provided from two or more LEDs of discrete colors or multicolored to indicate charge level over a range of charge states to provide higher resolution/increased granularity of the battery's charge state.

BACKGROUND

Battery packs for use with electronic equipment, tools, and various other devices often have some type of visual charge state indicators. These are typically in the form of a simple red or green LED light, or in some applications a bar light with two or more segments indicating charge state based on the number of segments illuminated. These types of displays typically provide minimal information regarding charge states between full and empty—in some cases merely indicating that the battery is either fully charged or out of charge.

Other devices have more complex charge state indicators, such as with LCD displays or other textual or graphic display types. These indicators tend to be more expensive than simple on/off LED displays.

There is a need in the art to provide less expensive visual information using minimally complex hardware that nevertheless provides a much higher level of charge state granularity than current display devices. Accordingly, the present invention addresses these and other needs in the art.

SUMMARY

This disclosure relates generally to rechargeable portable battery packs for use with tools and other devices. More specifically, but not exclusively, the disclosure relates to visual indicators on rechargeable battery packs using particular sequences of output lighting provided from two or more LEDs of discrete colors or multicolored to indicate charge level over a range of charge states to provide higher resolution/increased granularity of the battery's charge. In addition to discrete or standalone battery packs, the disclosures herein may also be used in embodiments of other devices where battery state indication is useful, such as directly on or within tools, electronic equipment, or other devices.

For example, in one aspect the disclosure relates to a battery pack for use with a portable device or to a display apparatus and method for other tools or equipment. The battery pack may include, for example, a housing including a mechanical attachment mechanism for removably coupling the battery pack to the portable device, a battery cell assembly positioned within the housing, an electrical power and charging connector assembly for electrically coupling the battery cell terminals to the portable device and/or to a battery charger, and an electronic circuit operatively coupled to the battery cell assembly. The electronic circuit may include a battery charge state monitoring circuit for receiving a signal associated with a charge state of the battery cell assembly and generating a charge state status output, a lighting element driver circuit, and an output display element. The output display element may include two or more differently colored lighting elements, operatively coupled to the driver circuit. The lighting elements may be two or more discrete colored lighting elements or one or more multicolored lighting elements or combinations thereof. The electronic circuit may control the lighting elements, such as LEDs, such that lighting elements provide, when the battery charge state is above a predefined intermediate charge state threshold, a first steady light output signal from a first of the colored lighting elements and a varying light output signal from a second of the colored lighting elements. The first varying light output may reflects a decrease from a fully charged state of the battery cell assembly when the battery charge state is above a predefined intermediate charge state threshold. When the battery charge state is below the predefined intermediate charge state threshold, a second varying light output signal from the first of the colored lighting elements and a first steady light output from the second of the colored lighting elements may be provided. The second varying light output may reflect a decrease from a fully charged state of the battery cell assembly when the battery charge state is below the predefined intermediate charge state threshold. The battery may include a legend providing a representation of the light output of the first and the lighting elements that corresponds to the charge state presented by the lighting elements.

In another aspect, the disclosure relates to a method for providing a charge state indication on a battery pack for use with a portable device or on a tool or other device or equipment. The method may include, for example, determining, in a charge state monitor circuit of the battery pack, a charge state of a battery cell or cells of the battery pack, and providing a visual indication of the charge state by illuminating two or more lighting elements of the battery pack in two or more different colors and/or flashing or blinking sequences, and/or duty cycles, and/or color shades, and/or varying colors. The indicators may be such that when the charge state is above a predefined intermediate charge state threshold, a first steady light output signal may be provided from a first colored lighting element and a varying light output signal may be provided from a second the colored lighting element, with the first varying light output reflecting a decrease from a fully charged state of the battery cell assembly when the battery charge state is above a predefined intermediate charge state threshold, and when the battery charge state is below the predefined intermediate charge state threshold, a second varying light output signal may be provided from the first of the colored lighting elements and a first steady light output may be provided from the second of the colored lighting elements, with the second varying light output reflecting a decrease from a fully charged state of the battery cell assembly when the battery charge state is below the predefined intermediate charge state threshold.

In another aspect, the disclosure relates to a battery pack for use with a portable device. The battery pack may include, for example, a housing including a mechanical attachment mechanism for removably coupling the battery pack to the portable device, a battery cell assembly positioned within the housing, an electrical power and charging connector assembly for electrically coupling the battery cell terminals to the portable device and/or to a battery charger, and an electronic circuit operatively coupled to the battery cell assembly. The electronic circuit may include a battery charge state monitoring circuit for receiving a signal associated with a charge state of the battery cell assembly and generating a charge state status output, a lighting element driver circuit, and an output display element, including two or more differently colored lighting elements, operatively coupled to the driver circuit. The electronic circuit may control the lighting elements so that when the battery charge state is above a half charged state plus an upper threshold, a first steady light output signal from a first of the colored lighting elements and a varying light output signal from a second of the colored lighting elements is presented, wherein the first varying light output reflects a decrease from a fully charged state of the battery cell assembly when the battery charge state is above a predefined intermediate charge state threshold, and when the battery charge state is below the half charged state plus a lower threshold, a second varying light output signal from the first of the colored lighting elements and a first steady light output from the second of the colored lighting elements are provided, wherein the second varying light output reflects a decrease from a fully charged state of the battery cell assembly when the battery charge state is below the predefined intermediate charge state threshold, and when the battery charge state is between the upper threshold and the lower threshold, the first colored light and the second colored light provide a steady light output signal.

In another aspect, the disclosure relates to a method for providing a charge state indication on a battery pack for use with a portable device. The method may include, for example, determining, in a charge state monitor circuit of the battery pack, a charge state of a battery cell or cells of the battery pack, and providing a visual indication of the charge state by illuminating two or more lighting elements of the battery pack in two or more different colors. When the charge state is above a half charged state plus an upper threshold, a first steady light output signal may be provided from a first colored lighting element and a varying light output signal may be provided from a second the colored lighting element, with the first varying light output reflecting a decrease from a fully charged state of the battery cell assembly when the battery charge state is above a predefined intermediate charge state threshold. When the battery charge state is below the half charged state and a lower threshold, a second varying light output signal may be provided from the first of the colored lighting elements and a first steady light output may be provided from the second of the colored lighting elements, with the second varying light output reflecting a decrease from a fully charged state of the battery cell assembly when the battery charge state is below the predefined intermediate charge state threshold. When the battery charge state is between the upper threshold and the lower threshold, the first colored light and the second colored light may provide a steady light output signal.

In another aspect, the disclosure relates to methods and processing for generating the charge state and other battery or equipment state information functionality as described above, in whole or in part.

In another aspect, the disclosure relates to means for implementing the above-described methods and/or system or device functions, in whole or in part.

In another aspect, the disclosure relates to computer-readable media including instructions for causing a computer or processing element to implement the charge state and other battery or equipment functionality described above, in whole or in part.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
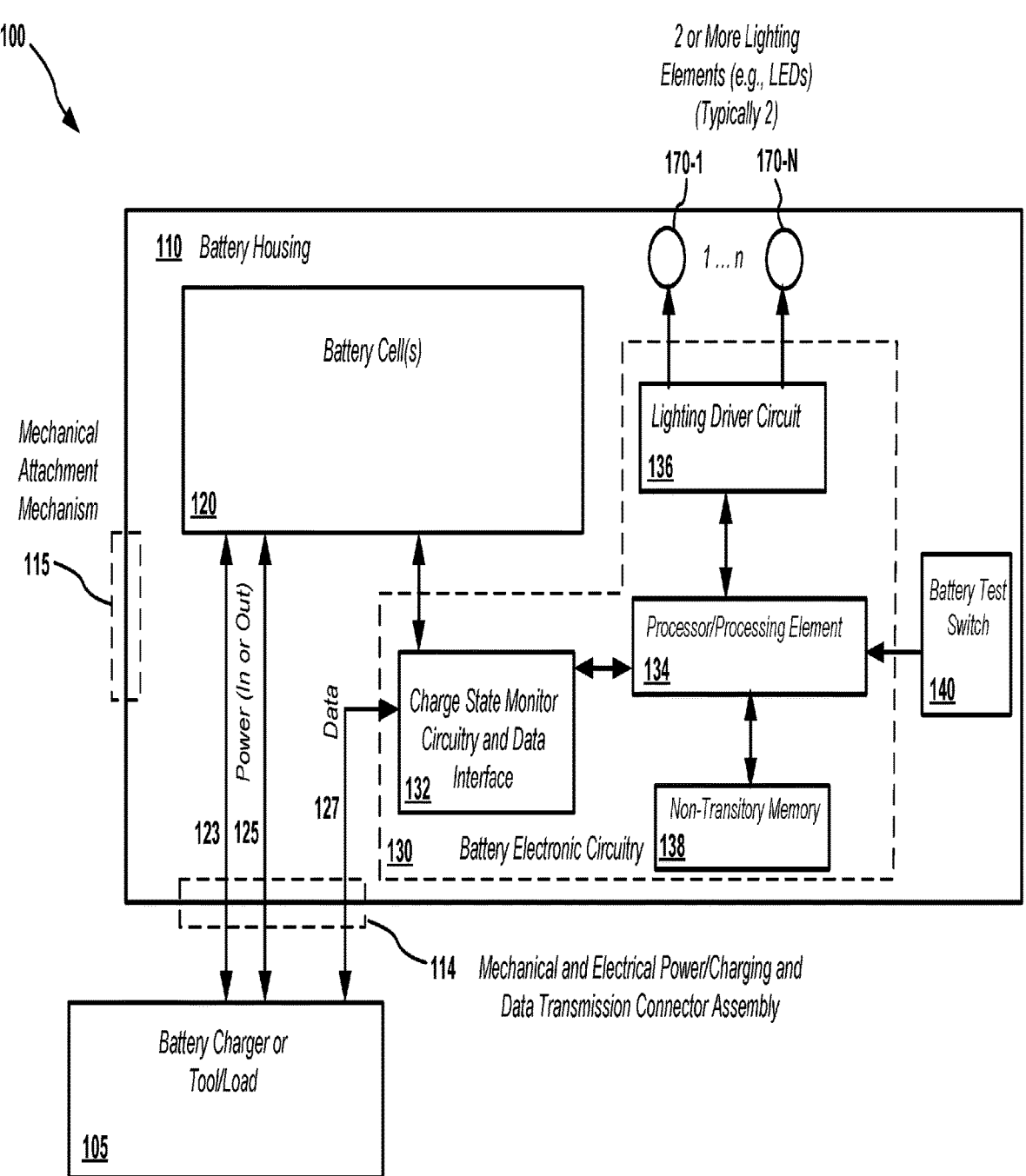
FIG. 1 illustrates details of elements of one embodiment of portable battery pack and associated charge state indicators in the form of LED lighting elements.

This disclosure relates generally to rechargeable portable battery packs for use with tools and other devices. More specifically, but not exclusively, the disclosure relates to visual indicators on rechargeable battery packs using particular sequences of output lighting provided from two or more LEDs of discrete colors or multicolored to indicate charge level over a range of charge states to provide higher resolution/increased granularity of the battery's charge. In addition to discrete or standalone battery packs, the disclosures herein may also be used in embodiments of other devices where battery state indication is useful, such as directly on or within tools, electronic equipment, or other devices. For example, the charge state display methods and apparatus described herein may also be implemented on equipment cases or housing, display panels, or other places, or on remote display devices such as on cellular phones, tablets, notebook computers, and the like.

For example, in one aspect the disclosure relates to a battery pack for use with a portable device or to a display apparatus and method for other tools or equipment. The battery pack may include, for example, a housing including a mechanical attachment mechanism for removably coupling the battery pack to the portable device, a battery cell assembly positioned within the housing, an electrical power and charging connector assembly for electrically coupling the battery cell terminals to the portable device and/or to a battery charger, and an electronic circuit operatively coupled to the battery cell assembly. The electronic circuit may include a battery charge state monitoring circuit for receiving a signal associated with a charge state of the battery cell assembly and generating a charge state status output, a lighting element driver circuit, and an output display element. The output display element may include two or more differently colored lighting elements, operatively coupled to the driver circuit. The lighting elements may be two or more discrete colored lighting elements or one or more multicolored lighting elements or combinations thereof. The electronic circuit may control the lighting elements, such as LEDs, such that lighting elements provide, when the battery charge state is above a predefined intermediate charge state threshold, a first steady light output signal from a first of the colored lighting elements and a varying light output signal from a second of the colored lighting elements. The first varying light output may reflects a decrease from a fully charged state of the battery cell assembly when the battery charge state is above a predefined intermediate charge state threshold. When the battery charge state is below the predefined intermediate charge state threshold, a second varying light output signal from the first of the colored lighting elements and a first steady light output from the second of the colored lighting elements may be provided. The second varying light output may reflect a decrease from a fully charged state of the battery cell assembly when the battery charge state is below the predefined intermediate charge state threshold. The battery may include a legend providing a representation of the light output of the first and the lighting elements that corresponds to the charge state presented by the lighting elements.

The two or more differently colored lighting elements may, for example, be a green lighting element as the first of the colored lighting elements and a red lighting element as the second of the colored lighting elements. The red and green lighting elements may be light emitting diodes (LEDs). The battery pack may include a legend illustrating charge state as a function of the state of the LEDs. The legend may be color coded such as to correspond with the LED lighting sequence. The legend may include a solid section and a plurality of oval sections for each of the LEDs, the sections illustrating the relative charge state when viewed in combination. There may be two solid sections and two oval sections. One solid section and one oval section may be colored or shaded red, and the other solid section and oval section may be colored green. Other colors may be used in alternate embodiments.

The predefined intermediate charge threshold may, for example, be a half charged state. The varying light output signals may be duty-cycle modulated signals, wherein the duty-cycle is proportionate with a current charge state of the battery pack. The varying light output signals may be flashing, with the flashing rate of the flashing sequences proportional to a current charge state of the battery pack. The light elements may indicate a failure mode via a code pattern. The code pattern may be a more code pattern provided from one or more of the lighting elements when a battery pack failure mode is sensed. The failure mode code pattern may be be a Morse Code SOS pattern.

In another aspect, the disclosure relates to a method for providing a charge state indication on a battery pack for use with a portable device or on a tool or other device or equipment. The method may include, for example, determining, in a charge state monitor circuit of the battery pack, a charge state of a battery cell or cells of the battery pack, and providing a visual indication of the charge state by illuminating two or more lighting elements of the battery pack in two or more different colors and/or flashing or blinking sequences, and/or duty cycles, and/or color shades, and/or varying colors. The indicators may be such that when the charge state is above a predefined intermediate charge state threshold, a first steady light output signal may be provided from a first colored lighting element and a varying light output signal may be provided from a second the colored lighting element, with the first varying light output reflecting a decrease from a fully charged state of the battery cell assembly when the battery charge state is above a predefined intermediate charge state threshold, and when the battery charge state is below the predefined intermediate charge state threshold, a second varying light output signal may be provided from the first of the colored lighting elements and a first steady light output may be provided from the second of the colored lighting elements, with the second varying light output reflecting a decrease from a fully charged state of the battery cell assembly when the battery charge state is below the predefined intermediate charge state threshold.

The first lighting element may, for example, be a green LED and the second lighting element may be a red LED. The lighting elements may provide a code or pattern for a battery state. A battery state may be a failure mode, and the failure mode code pattern may be provided from one or more of the lighting elements when a battery pack failure mode is sensed. The failure mode code pattern may be a Morse Code SOS pattern.

In another aspect, the disclosure relates to a battery pack for use with a portable device. The battery pack may include, for example, a housing including a mechanical attachment mechanism for removably coupling the battery pack to the portable device, a battery cell assembly positioned within the housing, an electrical power and charging connector assembly for electrically coupling the battery cell terminals to the portable device and/or to a battery charger, and an electronic circuit operatively coupled to the battery cell assembly. The electronic circuit may include a battery charge state monitoring circuit for receiving a signal associated with a charge state of the battery cell assembly and generating a charge state status output, a lighting element driver circuit, and an output display element, including two or more differently colored lighting elements, operatively coupled to the driver circuit. The electronic circuit may control the lighting elements so that when the battery charge state is above a half charged state plus an upper threshold, a first steady light output signal from a first of the colored lighting elements and a varying light output signal from a second of the colored lighting elements is presented, wherein the first varying light output reflects a decrease from a fully charged state of the battery cell assembly when the battery charge state is above a predefined intermediate charge state threshold, and when the battery charge state is below the half charged state plus a lower threshold, a second varying light output signal from the first of the colored lighting elements and a first steady light output from the second of the colored lighting elements are provided, wherein the second varying light output reflects a decrease from a fully charged state of the battery cell assembly when the battery charge state is below the predefined intermediate charge state threshold, and when the battery charge state is between the upper threshold and the lower threshold, the first colored light and the second colored light provide a steady light output signal.

In another aspect, the disclosure relates to a method for providing a charge state indication on a battery pack for use with a portable device. The method may include, for example, determining, in a charge state monitor circuit of the battery pack, a charge state of a battery cell or cells of the battery pack, and providing a visual indication of the charge state by illuminating two or more lighting elements of the battery pack in two or more different colors. When the charge state is above a half charged state plus an upper threshold, a first steady light output signal may be provided from a first colored lighting element and a varying light output signal may be provided from a second the colored lighting element, with the first varying light output reflecting a decrease from a fully charged state of the battery cell assembly when the battery charge state is above a predefined intermediate charge state threshold. When the battery charge state is below the half charged state and a lower threshold, a second varying light output signal may be provided from the first of the colored lighting elements and a first steady light output may be provided from the second of the colored lighting elements, with the second varying light output reflecting a decrease from a fully charged state of the battery cell assembly when the battery charge state is below the predefined intermediate charge state threshold. When the battery charge state is between the upper threshold and the lower threshold, the first colored light and the second colored light may provide a steady light output signal.

The portable battery pack device embodiments and methods disclosed herein may be used in combination with various powered tools and electronic devices. The battery state display apparatus and methods may, by themselves, be used to provide a visual charge state display on equipment or tool housings, panels, and the like. In exemplary embodiments, the disclosures herein may be used in combination with batteries for use with buried utility locator devices, utility locator transmitter devices, video pipe inspection systems, camera control units, powered push-cable deployment and retraction systems, power saws, drills, drain cleaning cutters or jetters, and other tools and devices that use interchangeable battery packs.

Exemplary locator and camera device and system embodiments that may be used in combination with the battery pack device and method disclosures herein in further embodiments include the devices and systems disclosed in the following co-assigned patents and patent publications: U.S. Pat. No. 7,619,516, issued Mar. 11, 2005, entitled Single and Multi-Trace Omnidirectional Sonde and Line Locators and Transmitter Used Therewith; U.S. Pat. No. 7,009,399, issued Mar. 7, 2006, entitled Omnidirectional Sonde and Line Locator; U.S. Pat. No. 7,332,901, issued Feb. 19, 2008, entitled Locator with Apparent Depth Indication; U.S. Pat. No. 7,336,078, issued Feb. 26, 2008, entitled Multi-Sensor Mapping Omni-Directional Sonde and Line Locators and Transmitter Used Therewith; U.S. Pat. No. 8,248,056, issued Oct. 31, 2008, entitled A Buried Object Locator System Employing Automated Virtual Depth Event Detection and Signaling; U.S. Pat. No. 7,498,797, issued Mar. 3, 2009, entitled Locator with Current-Measuring Capability; U.S. Pat. No. 7,741,848, issued Sep. 22, 2010, entitled Adaptive Multichannel Locator System for Multiple Proximity Detection; U.S. Pat. No. 7,825,647, issued Nov. 2, 2010, entitled Compact Line Illuminator for Locating Buried Pipes and Cables; U.S. patent application Ser. No. 12/947,503, filed Nov. 16, 2010, entitled IMAGE-BASED MAPPING LOCATING SYSTEM; U.S. Pat. No. 9,057,754, issued Mar. 4, 2011, entitled Economical Magnetic Locator Apparatus and Method; U.S. Pat. No. 7,969, 151, issued Jun. 28, 2011, entitled Pre-Amplifier and Mixer Circuitry for a Locator Antenna; U.S. patent application Ser. No. 13/189,844, filed Jul. 25, 2011, entitled BURIED LOCATOR SYSTEMS AND METHODS; U.S. Pat. No. 7,990,151, issued Aug. 2, 2011, entitled Tri-Pod Buried Locator System; U.S. Pat. No. 8,013,610, issued Sep. 6, 2011, entitled High Q Self-Tuning Locating Transmitter; U.S. Pat. No. 8,035,390, issued Oct. 11, 2011, entitled Omnidirectional Sonde and Line Locator; U.S. Pat. No. 8,106,660, issued Jan. 31, 2012, entitled Sonde Array for Use with Buried Line LocatoR; U.S. patent application Ser. No. 13/493,883, issued Jun. 11, 2012, entitled MAGNETIC SENSING BURIED OBJECT LOCATOR INCLUDING A CAMERA; U.S. Pat. No. 8,203,343, issued Jun. 19, 2012, entitled Reconfigurable Portable Locator Employing Multiple Sensor Arrays Having Flexible Nested Orthogonal Antennas; U.S. patent application Ser. No. 13/584,799, issued Aug. 13, 2012, entitled BURIED OBJECT LOCATOR SYSTEMS AND METHODS; U.S. patent application Ser. No. 13/602,303, filed Sep. 3, 2012, entitled WIRELESS BURIED PIPE AND CABLE LOCATING SYSTEMS; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled System and Method for Locating Buried Pipes and Cables with a Man Portable Locator and a Transmitter in a Mesh Network; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/793, 168, filed Mar. 3, 2013, entitled BURIED OBJECT LOCATORS WITH CONDUCTIVE ANTENNA BOBBINS; U.S. patent application Ser. No. 13/797,711, filed Mar. 6, 2013, entitled DUAL SENSED LOCATING SYSTEMS AND METHODS; U.S. patent application Ser. No. 13/850,181, filed Mar. 25, 2013, entitled GRADIENT ANTENNA COILS AND ARRAYS FOR USE IN LOCATING SYSTEMS; U.S. patent application Ser. No. 13/851,851, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL GROUND TRACK- ING APPARATUS, SYSTEMS AND METHODS; U.S. patent application Ser. No. 14/080,582, filed Nov. 14, 2013, entitled MULTI-FREQUENCY LOCATING SYSTEMS AND METHODS; U.S. Pat. No. 8,547,428, issued Oct. 1, 2013, entitled Pipe Mapping System; U.S. patent application Ser. No. 14/053,401, filed Oct. 14, 2013, entitled BURIED OBJECT LOCATING DEVICES AND METHODS; U.S. patent application Ser. No. 14/148,649, filed Jan. 6, 2014, entitled MAPPING LOCATING SYSTEMS AND METH-ODS; U.S. patent application Ser. No. 14/154,128, filed Jan. 13, 2014, entitled UTILIY LOCATOR SYSTEMS AND METHODS; U.S. patent application Ser. No. 14/179,538, filed Feb. 12, 2014, entitled OPTICAL GROUND TRACK-ING APPARATUS, SYSTEMS, AND METHODS; U.S. patent application Ser. No. 14/229,813, filed Mar. 28, 2014, entitled UTILITY LOCATOR TRANSMITTER APPARA-TUS AND METHODS; U.S. patent application Ser. No. 14/321,699, filed Jul. 1, 2014, entitled UTILITY LOCATOR APPARATUS, SYSTEMS, AND METHODS; U.S. patent application Ser. No. 14/332,268, filed Jul. 15, 2014, entitled UTILITY LOCATOR TRANSMITTER DEVICES, SYS-TEMS, AND METHODS WITH DOCKABLE APPARA-TUS; U.S. patent application Ser. No. 14/446,279, filed Jul. 29, 2014, entitled INDUCTIVE CLAMP DEVICES, SYS-TEMS, AND METHODS; U.S. patent application Ser. No. 14/516,558, filed Oct. 16, 2014, entitled ELECTRONIC MARKER DEVICES AND SYSTEMS; U.S. patent appli-cation Ser. No. 14/580,097, filed Dec. 22, 2014, entitled NULLED-SIGNAL LOCATING DEVICES, SYSTEMS, AND METHODS; U.S. patent application Ser. No. 14/733, 810, filed Jun. 8, 2015, entitled ECONOMICAL MAG-NETIC LOCATOR APPARATUS AND METHODS; U.S. patent application Ser. No. 14/752,834, filed Jun. 27, 2015, entitled GROUND TRACKING APPARATUS, SYSTEMS, AND METHODS; U.S. patent application Ser. No. 14/797, 840, filed Jul. 13, 2015, entitled GROUND-TRACKING DEVICES AND METHODS FOR USE WITH A UTILITY LOCATOR; U.S. Pat. No. 9,081,109, issued Jul. 14, 2015, entitled Ground-Tracking Devices for Use with a Mapping Locator; U.S. patent application Ser. No. 14/800,490, filed Jul. 15, 2015, entitled UTILITY LOCATOR TRANSMIT-TER DEVICES, SYSTEMS, AND METHODS WITH SAT-ELLITE AND MAGNETIC FIELD SONDE ANTENNA SYSTEMS; U.S. Pat. No. 9,085,007, issued Jul. 21, 2015, entitled Marking Paint Applicator for Portable Locator; U.S. Provisional Patent Application 62/209,824, filed Aug. 25, 2015, entitled COMBINED PASSIVE AND ACTIVE UTILITY LOCATING DEVICES, SYSTEMS, AND METHODS; U.S. Provisional Patent Application 62/244, 658, filed Oct. 21, 2015, entitled SIGNAL KEYING UTIL-ITY LOCATING DEVICES, SYSTEMS, AND METH-ODS; U.S. patent application Ser. No. 14/949,868, filed Nov. 23, 2015, entitled BURIED OBJECT LOCATOR APPARA-TUS AND SYSTEMS; U.S. Provisional Patent Application 62/260,199, filed Nov. 25, 2015, UTILITY LOCATING SYSTEMS, DEVICES, AND METHODS USING RADIO BROADCAST SIGNALS; U.S. Provisional Patent Appli-cation 62/295,502, filed Feb. 16, 2016, entitled BURIED UTILITY MARKER DEVICES, SYSTEMS, AND METH-ODS; U.S. Provisional Patent Application 62/307,365, filed Mar. 11, 2016, entitled UTILITY LOCATOR SUPPORT STRUCTURES; U.S. Pat. No. 9,341,740, issued May 17,2016, entitled Optical Ground Tracking Apparatus, Sys-tems, and Methods; U.S. patent application Ser. No. 15/187, 785, filed Jun. 21, 2016, entitled BURIED UTILITY LOCA-TOR GROUND TRACKING APPARATUS, SYSTEMS, AND METHODS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,372,117, issued Jun. 21, 2016, entitled Optical Ground Tracking Methods and Apparatus for Use with Buried Utility Locators; U.S. patent application Ser. No. 15/225,623, filed Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,067, issued Aug. 9, 2016, entitled Ground-Tracking Systems and Apparatus; U.S. Pat. No. 9,411,066, issued Aug. 9, 2016, entitled Sondes and Meth-ods for use with Buried Line Locator Systems; U.S. patent application Ser. No. 15/247,503, filed Aug. 25, 2016, entitled LOCATING DEVICES, SYSTEMS, AND METH-ODS USING FREQUENCY SUITES FOR UTILITY DETECTION; U.S. patent application Ser. No. 14/140,347, filed Dec. 24, 2013, entitled SEMICONDUCTOR LIGHT-ING DEVICES AND METHOD; and U.S. Pat. No. 9,435, 907, issued Sep. 6, 2016, entitled Phase Synchronized Buried Object Locator Apparatus, Systems, and Methods. The content of each of these patents and applications is incorporated by reference herein in its entirety. These appli-cations and patents may be referred to collectively herein as the "incorporated applications."

Various details of embodiments of battery packs into which the indicator methods and apparatus disclosed herein may be incorporated are described in co-assigned patent applications including, for example, U.S. patent application Ser. No. 13/532,721, filed Jun. 25, 2012, entitled MODU-LAR BATTERY PACK APPARATUS, SYSTEMS, AND METHODS, and U.S. patent application Ser. No. 13/925, 636, filed Jun. 24, 2013, entitled MODULAR BATTERY PACK APPARATUS, SYSTEMS, AND METHODS INCLUDING VIRAL DATA AND/OR CODE TRANSFER, now U.S. Pat. No. 10,090,498. The content of each of these applications is incorporated by reference herein in its entirety.

Various additional aspects, features, and functions are described below in conjunction with FIGS. 1 through 12 of the appended Drawings.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodi-ments within the spirit and scope of the present disclosure.

It is noted that as used herein, the term, "exemplary" means "serving as an example, instance, or illustration." Any aspect, detail, function, implementation, and/or embodiment described herein as "exemplary" is not neces-sarily to be construed as preferred or advantageous over other aspects and/or embodiments.

Example Battery Pack Apparatus and Methods

FIG. 1 illustrates details of one embodiment of a portable battery pack 100 in accordance with certain aspects, along with a battery powered tool or other device 105. Battery pack 100 may include a battery housing 110 with battery cell(s) enclosed therein for providing output power to the coupled tool 105 or for receiving charging power from the tool/charger 105. Code and/or data may also be interchanged between the battery pack and charger or tool as described in the incorporated modular battery pack applications Ser. Nos. 13/352,721 and 13/925,636 via the power conductors 123 and 125 and/or via a separate data conductor 127 and/or via a wireless communication connection such as, for example, Wi-Fi, Bluetooth, or other wireless communications connections via corresponding receiver, transmitter, or transceiver modules . . . . The various contacts and conductors may be part of a power and charging connector assembly 114 as shown in FIG. 1.

The battery pack 100 may also include electronic circuits 130 with associated analog or digital electronics 132 to monitory battery charge state and/or provide a data interface to a tool, charger, or other operatively coupled electronic device or system. Additional electronics may include one or more processing elements 130 for controlling operation of the battery charge and discharge cycles and/or for storing battery storage, cycling, and/or discharge data in one or more non-transitory memory devices 138, and/or for controlling the lighting elements 170, associated lighting driver circuitry 136, and/or other output devices such as sound generating elements such as piezo drivers, magnetic speakers, or other sound generation devices. The battery pack 100 may also include a battery test switch or switches 140 to receive user input to initiate battery charge status displays and/or to control other operations, such as data transfer, storage, test operations, and the like.

Although shown in FIG. 1 as lighting elements 170-1 through 170-N, in an exemplary embodiment, two LED lights may be used, and these may be in the form of green and red LEDs. However, various other embodiments in accordance with the spirit and scope of the present invention may use different numbers and/or colors of lighting, as well as other lighting elements, such as LCD displays, or other lighting or display technologies known or developed in the art.

Figure 2A:
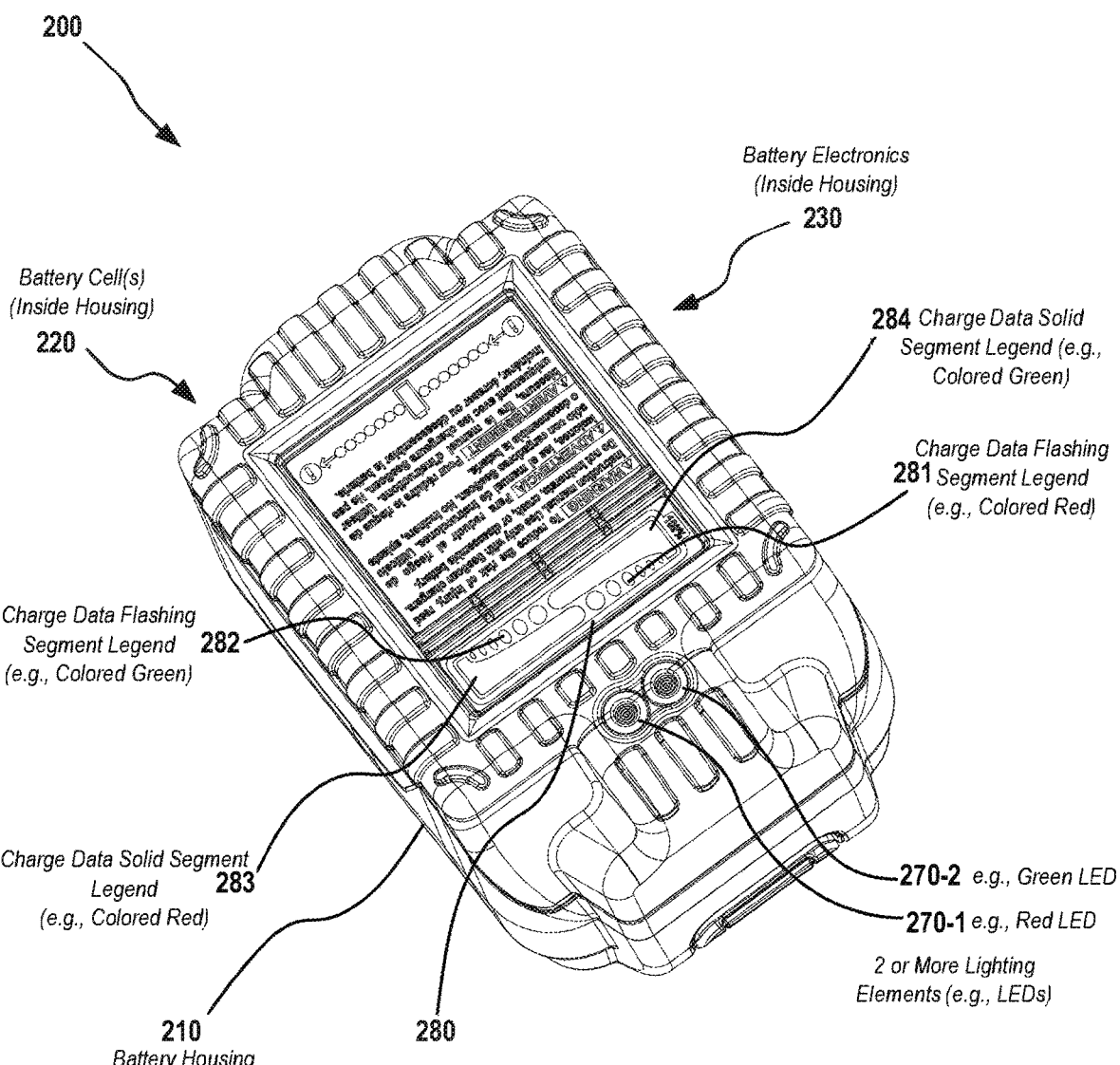
FIG. 2A illustrates details of one embodiment of a portable battery pack housing including two LED lighting elements for providing charge state indication.

FIG. 2A illustrates details of an exemplary embodiment of a battery pack 200. Battery pack 200 may include various elements as illustrated in FIG. 1. For example, battery pack 200 may include a housing or case 210, which may comprise a plastic and/or metallic material, one or more battery cells 220 mounted within the housing 210, electronics 230 mounted within the housing and operatively coupled to the battery cells 220 as well as to external device connectors (not shown in FIG. 2A) for providing/receiving power and/or data. In addition, battery pack 200 may include two lighting elements in the form of LEDs 270-1 and 270-2 which may be mounted within the housing to be visible to a user. The LEDs may be red and green LEDs, or, in alternate embodiments, may be other colors and/or numbers of LEDs.

The battery pack 200 of FIG. 2A also include a legend 280, including details 281 through 284, which may be in the form of a printed label, molded graphic, or other label format to provide an illustrative representation of the charge state information as reflected in the lighting elements 270. Legend 280 may include a representation, preferably in color, showing the corresponding LED lighting indications as a function of battery charge level. For example, in the exemplary embodiment of FIG. 2A, legend 280 includes a graphical representation of a green (or other first color) LED sequence shown as solid segment 284, representing an LED solid light display, and an oval-shaped (or other broken symbol) segment 282, representing a flashing or other modulated green LED output. As shown in FIG. 2A, the green segments 284 and 282 represent an exemplary green LED sequence as battery charge decreases from right (full charge state at the extreme right of segment 284) to left (empty charge state at the extreme left of the oval-shaped segment). The width of the ovals in legend segment 282 may be used to represent the approximate amount of discharge, with the wider ovals near the center representing a charge state of slightly below half, to the narrow ovals on the left side representing decreasing charge state. Legend segments 283 and 282 represent exemplary corresponding red (or other second color) LED sequences from solid on the far left (representing the fully discharged state) to the full charge state (represented by increasing narrow ovals in segment 281. When viewed in combination, the displayed red and green LEDs (or other colors in alternate embodiments) provide a unique, quickly readable representation of the overall charge state, with much more granularity compared to existing charge state displays. This method and device configuration allows much more information to be displayed using a combination of simple and low cost elements such as two LEDs (in the example shown, more LEDs or other lighting elements may be used in alternate embodiments). Likewise, other legends with various representations of charge state corresponding to that displayed on LEDs or other lighting elements may also be used in various embodiments.

Figures 2B, 2C:
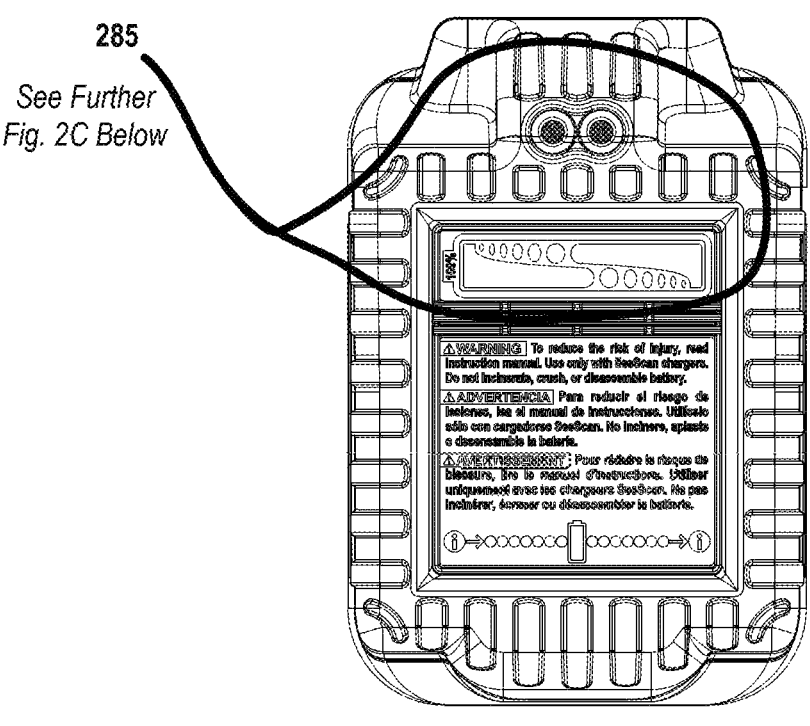
FIG. 2B illustrates details of one embodiment of a portable battery pack housing legend showing charge state based on lighting provided by two (e.g., green and red) LED elements.
FIG. 2C illustrates additional details the legend layout and coloring (e.g., green and red), and LED lights (e.g., green and red) shown in FIG. 2B.

FIG. 2B illustrates a display status portion 285 of the legend label 280 with details of the exemplary graphical representation of various charge states as reflected in the lighting of the LEDs 270-1 and 270-2. A predefined intermediate charge state, such as, for example, a half charge state, may be used as a threshold for varying light sequences above and below, as well as, in some embodiments, in a range about the intermediate charge state.

FIG. 2C illustrates additional details of the exemplary display status 285 and green and red LEDs 270-1 and 270-2. In operation, the LEDs 270-1 and 270-2 have varying on/off duty cycles that represent charge state. In alternate embodiments, other display parameters, such as frequency, amplitude, color, and the like may be varied on two or more LEDs to indicate the relative charge state.

In the exemplary embodiment, the duty cycles (or in alternately embodiments, other parameters such as flash rates, fade in/out rates, color changes, etc.) of the exemplary green and red LEDs are shown in the lower section legend 280 of the display area 285. Legend 280 illustrates the display duty cycle of the red and green LEDs from a fully charged state, to the far left of the display when the green LED is on continuously (and shown in the legend as solid green in segment 284) and the red LED is off, to a fully discharged state to the far right where the red LED is on continuously (and shown in the legend as solid red in segment 283) and the green LED is off. The bar 284, which in an exemplary embodiment is colored green (or other colors corresponding to a first of the LEDs) represents the duty cycle of the green LED, which is 100 percent on when the graphic is solid and then progressively decreasing to the right as the charge decreases. In an exemplary embodiment, the LED lighting changes from solid light to a modulated light (as represented in legend segment 282 with ovals) at approximately the half charged state. Ovals 282 represent decreasing duty cycle as they become progressively thinner. Conversely, the ovals 281 and bar 283 reflect the relative amount of discharge as displayed by the red (or other second color) LED, which in the exemplary embodiment are inverse of the green LEDs. The legend segments 281-284 may, as noted above, be colored green (or another color corresponding to the first LED) in legend segments 284 and 282, and may be colored red (or another color corresponding to the second LED) in legend segments 281 and 283. Other shapes, sizes, or other representational details may be used in alternate legend embodiments to provide a user a nontextual visual representation of the output of the two (or more in some embodiments) LEDs 270-1 and 270-2 to allow a user to quickly match the LED lighting outputs with a corresponding, highly granular, battery charge state.

For example, a fully charged battery pack will be reflected by the green LED 270-1 being turned on at a 100 percent duty cycle or pulse width at a predefined frequency (e.g., 1, Hz, 10 Hz, etc.), (or other parameters, such as pulse position, frequency, etc.) when the battery is fully charged (reflecting the bar status 284) and the red LED 270-2 will be at a small or zero percent duty cycle, fade in/fade out cycling, ramped intensity, or alternately or in addition, pulse position, frequency, and the like. This may be thought of as the green indicating percent charged based on duty cycle (or other parameter) and red may be thought of as percent discharged, so that a fully battery will show only or mostly green on at 100 percent, and a fully discharged battery will show fully or mostly red. In between, the duty cycle/pulse width (or pulse position, frequency, etc.) of each may be varied to reflect corresponding amounts of remaining charge and discharge.

In the exemplary embodiment of FIG. 2C, as the battery discharges through the 50 percent discharge state, the green LED stays on at or close to 100 percent, while the duty cycle of the red light progressively increases from zero or close to zero to 100 percent. At a 50 percent charge level, both red and green LEDs may be on at 100 percent or some common level. Then as the charge drops below 50 percent, the red light may stay on at 100 percent or close to 100 percent and green light duty cycle (or other parameters) may progressively decrease to zero.

Figure 3A:
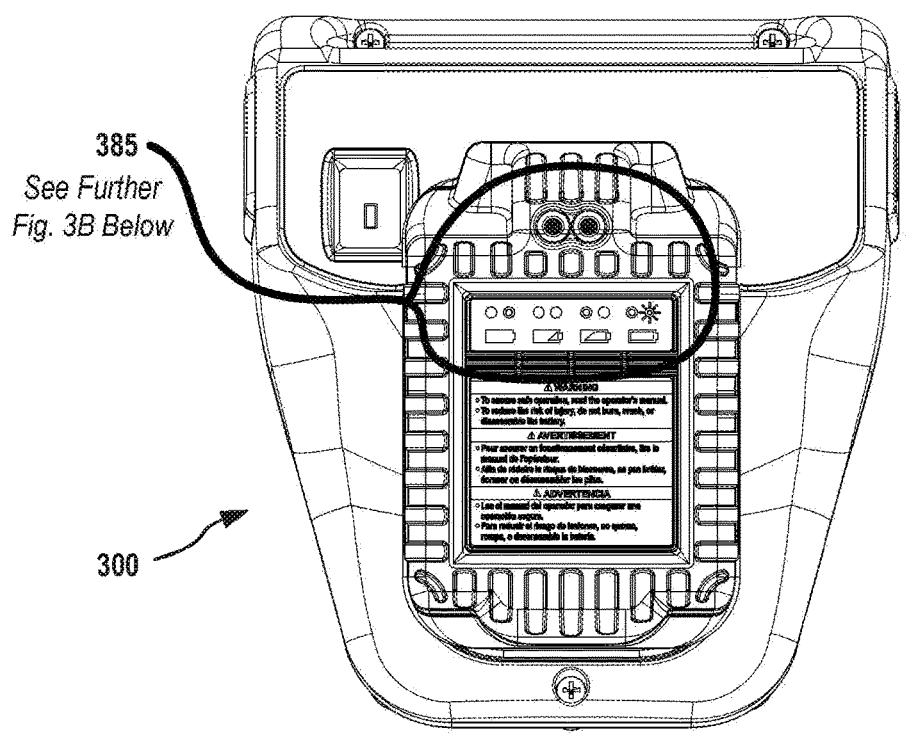
FIGS. 3A-3B illustrate details of another portable battery pack embodiment and LED light sequence legends.
Figure 3B:
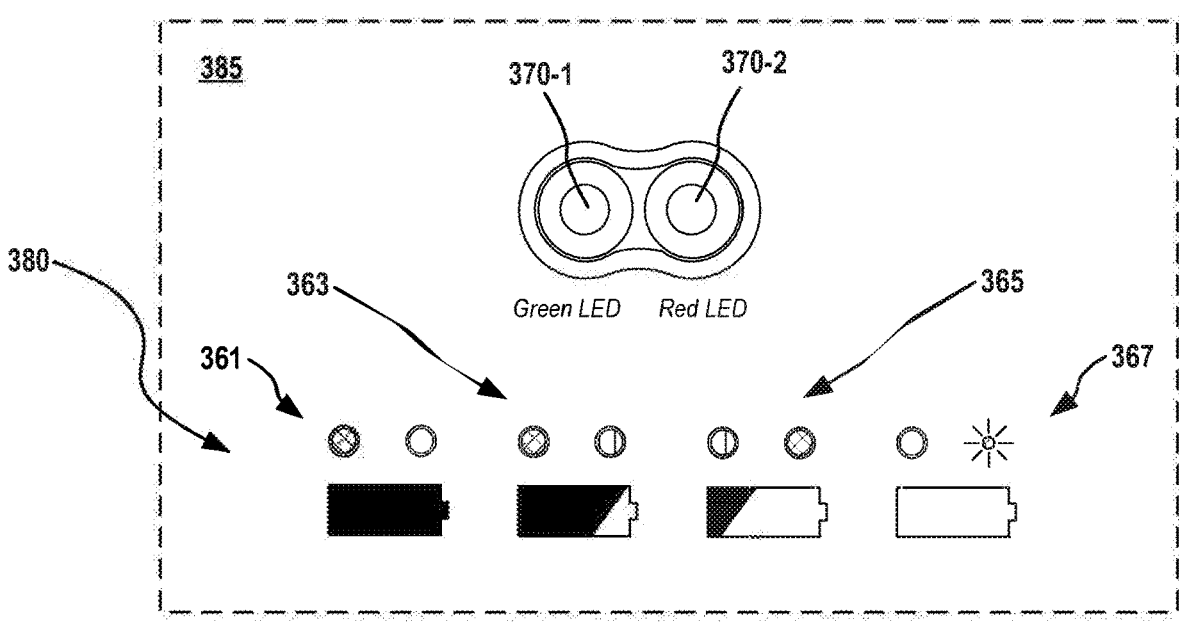

FIG. 3A and FIG. 3B illustrate an alternate display mechanism to represent charge state with two red and green LEDs 370-1 and 370-2 reflecting progressively changing values as the battery charge state moves from fully charged (as shown on the lower left at element 361) through fully discharged (shown on the lower right at element 367). In this implementation, as shown by legend 380, the output of the two LEDs 370-1 and 370-2 may be varied in amplitude, fade in/fade out, ramped intensity, frequency, pulse width, pulse position, or other parameters such that the resulting combination of red and green reflects a relative charge state between fully charged and fully discharged. For example, in the fully charged state, the green LED 370-1 as indicated by 261 may be fully on, and the red LED 370-2 may be fully off. As the battery discharges, the relative amplitude, frequency, pulse width or duty cycle, pulse position, color, or other parameter may be varied so that a series of charge states from fully charged to fully discharged may be represented. For example, at state 267 in FIG. 3B, the red LED light 370-2 may be fully on the green LED 370-1 may be fully off to indicate full discharge.

Figure 4:
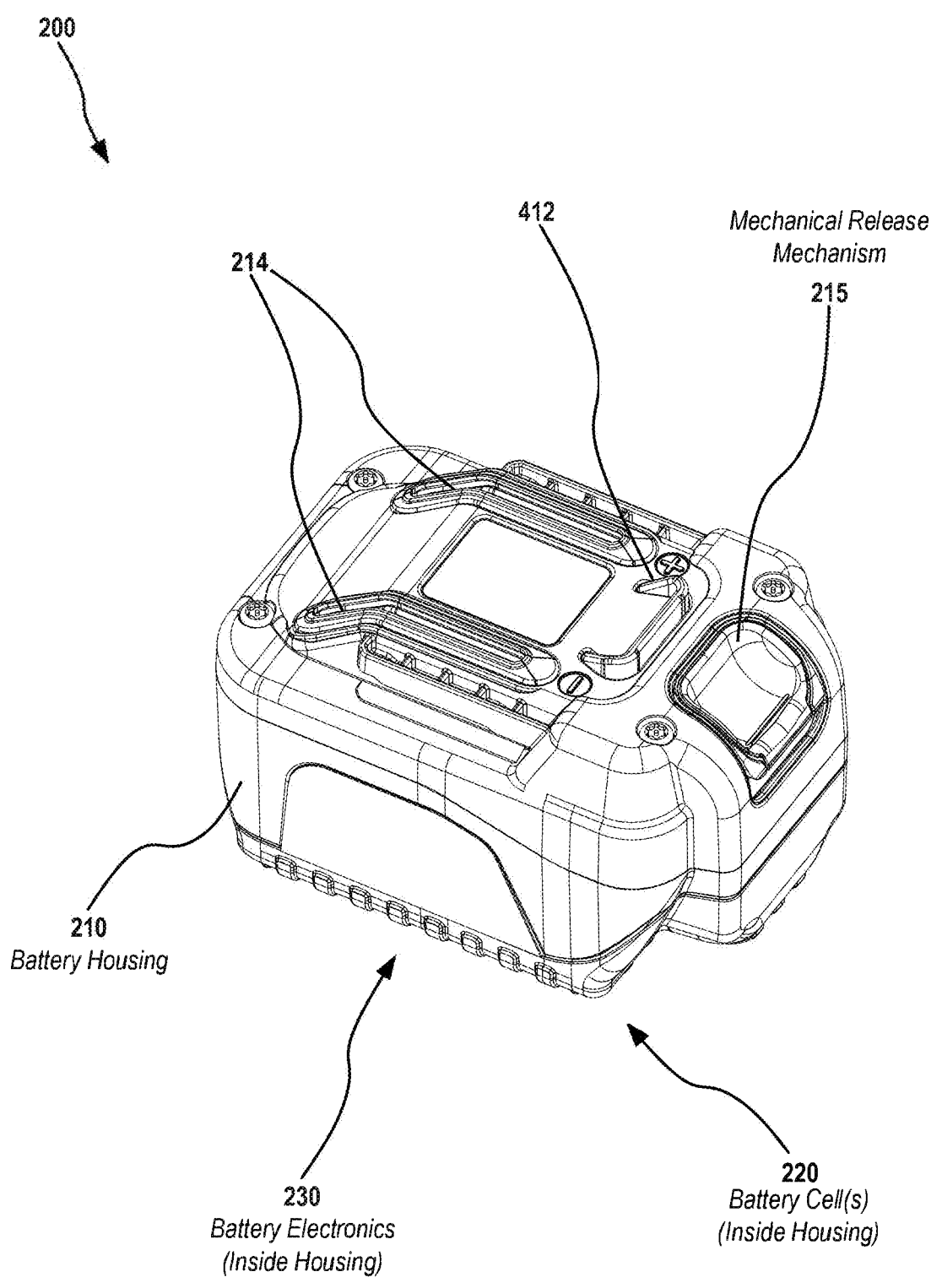
FIG. 4 illustrates additional details of the battery pack embodiment of FIG. 2A showing connectors and other elements.

In use, the charge state may be presented to a user by actuation of a test or battery status switch on the battery pack, such as, for example, battery test switch 140 as shown in FIG. 1 and/or release mechanism 215 as shown in FIG. 4. The test switch 140 functionality may be implemented using a standalone test switch (not shown in FIG. 2A) and/or may be incorporated with another battery function, such as the attachment/release mechanism 215 as shown in FIG. 4, or via an electrical connection, such as when the terminals of connector 214 are engaged.

Alternately, or in addition, the battery status may be displayed in response to a usage condition, such as, for example, when the battery is connected to a tool or other device, connected to a charger, removed from a tool or charged, at predetermined reference levels (e.g., at ¾, ½, ¼., etc.), or based on other physical or operational parameters. Other conditions may also be indicated, such as a failure alarm if cells or electronics fail or are sensed or determined to be in a non-operational condition. This may be done by providing distinct signaling on the two or more LEDs, such as both flashing, or use of different pulse widths/duty cycles, frequencies, or other parameters.

In addition, audible indications may be provided representing battery charge states in addition to or in place of the visual indicators. These may be provided through audio buzzers, speakers, or other sound generation devices (not shown) in the battery pack or in coupled tools, chargers, or other devices. Use of tones at two or more frequencies, similar to the use of two or more LED parameters (e.g., colors) may also be used with audible indications.

Returning to FIG. 4, additional elements of the battery pack 200 may include the power and data connector assembly 214, which may include power contacts as well as data contacts, and mechanical attachment/release element 412. Battery cells (not shown in FIG. 4) may be enclosed in the housing 210, along with electronics such as are shown in FIG. 1. The electronics may implement the methods further described subsequently herein to control visual display from the two or more LEDs.

Figure 5:
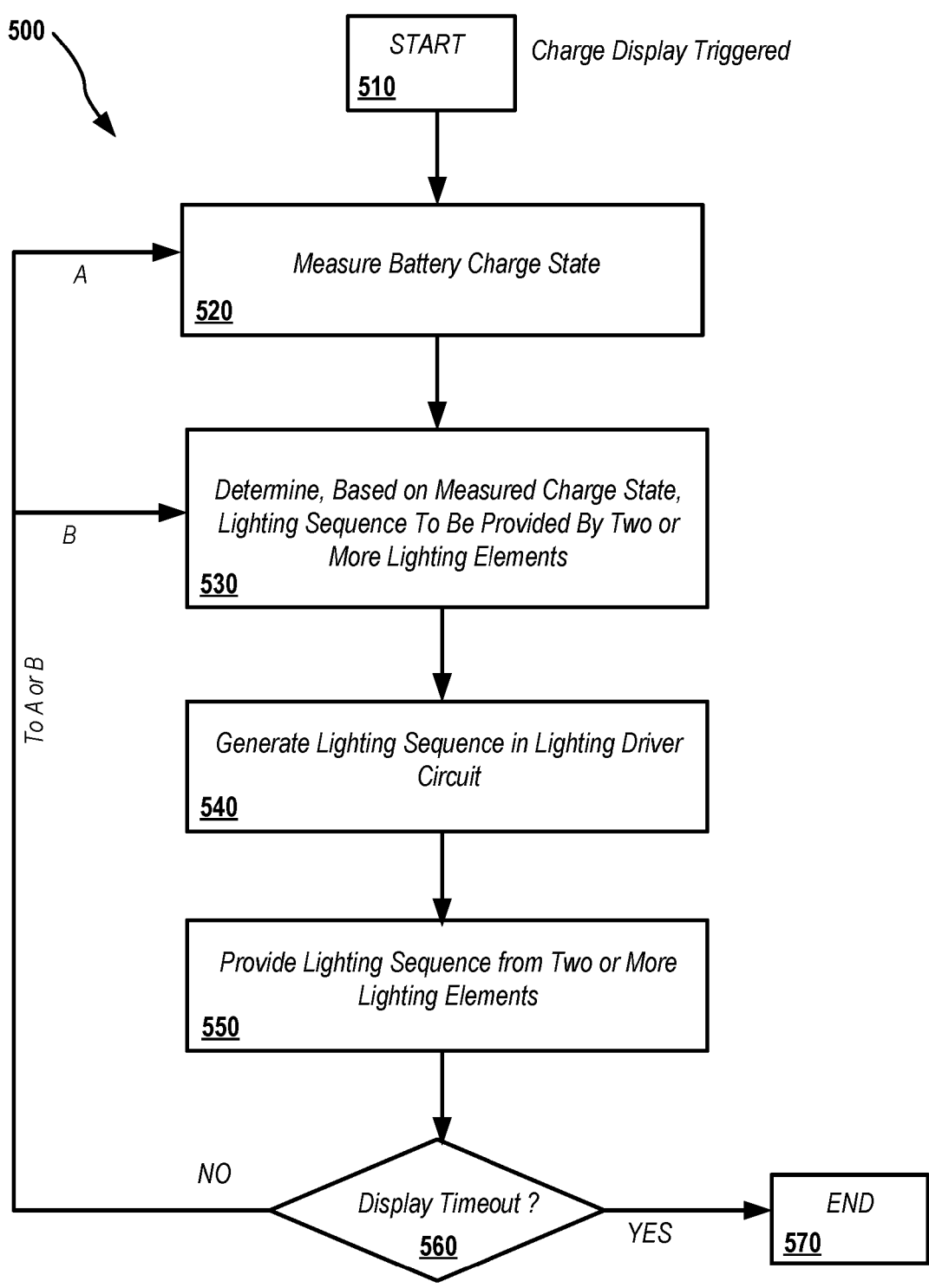
FIG. 5 illustrates details of an embodiment of a process for generating a visual display of battery charge state on two more lighting elements such as LEDs.

FIG. 5 illustrates details of one embodiment of a visual display method or process 500 for providing a visual indication of battery charge state based on provision of different light patterns on two (or in alternate embodiments more) lighting elements, typically LEDs having different colors. Process 500 may be implemented in one or more processing elements based on instructions stored on one or more non-transitory storage media. For example, process 500 may be implemented on processing element 134 as shown in FIG. 1, with the instructions for processors in processing element 134 stored in non-transitory memory 138. Additional data, such as charge stage, battery conditional parameters, such as temperature, number of charge cycles, or other physical or operational parameters may also be stored in non-transitory memory 138 or other memory(ies) not shown in FIG. 1.

Process 500 may begin at stage 510, with a triggering signal to initiate display of charge parameters on two (or more) LEDs, such as LEDs 270-1 and 270-2. At stage 520, a determination may be made or a parameter measured that is associated with a battery charge state, such as by measuring cell voltages, measuring current/electron flow, or by other battery cell charge metrics and measurement methods. At stage 540, based on the determined charge level from stage 530, a lighting sequence for the two (or more) LED or other lighting elements may be chosen. In an exemplary embodiment, the lighting sequence may be as described previously with respect to FIGS. 2B and 2C, or based on other display provisions described herein, such as described in FIG. 6 through FIG. 12.

At stage 550, the selected display sequence may be provided by the two or more lighting elements, such as LEDs. This may be done in conjunction with a lighting element driver circuit, such as driver circuit 136, which may include electronics to drive multiple LEDs or other lighting elements in a particular pattern by providing corresponding voltage and current signals to the LEDs at desired voltage and current amplitudes, frequencies, pulse widths, pulse positions, and the like. In an exemplary embodiment, a green LED and a red LED are driven with duty cycles and output levels in accordance with the legend shown in FIG. 2C or 3B; however, other display formats may also be used in alternate embodiments.

At stage 560, a determination may be made as to whether to continue to provide the display or not. This stage may be omitted in some embodiments where the display is driven a defined number of times, a defined time period, in response to specific operating conditions (e.g., when connected to a tool, charger, etc., or when a test is actuated by a user), or based on other conditions or inputs. If a decision is made to continue the display, execution of process 500 may return to stage 520 to repeat, or, in some embodiments, the display output may be repeated at other stages, such as at stage 530 (assuming the same charge state), or directly to stage 540. If a display timeout condition of YES is determined at stage 560, the process 500 may terminate at stage 570, such as by turning off the LEDs or other lighting elements, or initiating other lighting sequences (e.g., such as a unique failure sequence, a steady stage sequence, or other sequences not specifically related to battery charge state).

Figure 6:
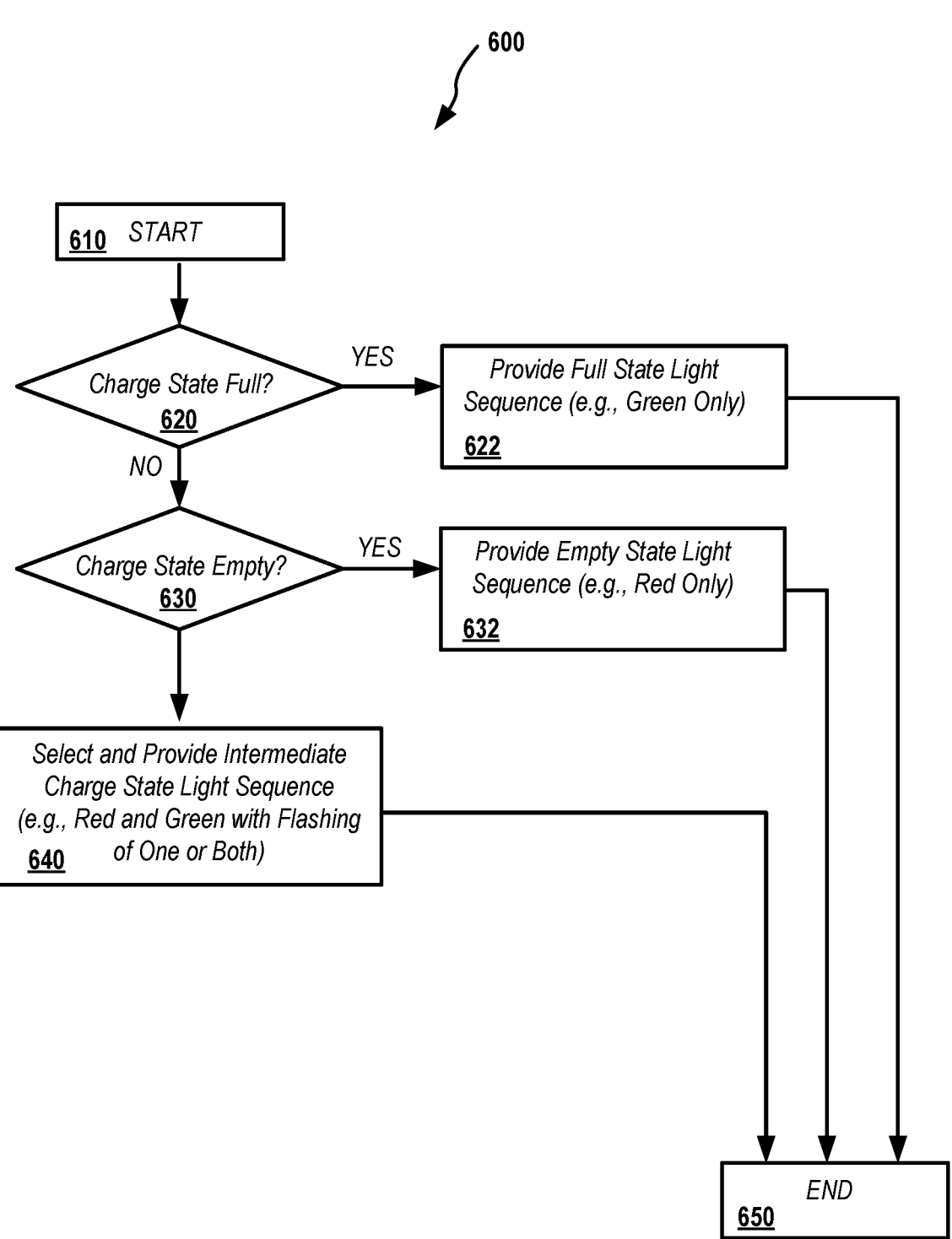
FIG. 6 illustrates details of an embodiment of a process for generating a visual display of battery charge state on two more lighting elements such as LEDs.

FIG. 6 illustrates details of an embodiment of a method/process 600 for providing a visual display of battery charge state on two or more lighting elements, such as LEDs 270-1 and 270-2 of FIG. 2C, or 370-1 and 370-2 of FIG. 3B. Process 600 may begin at a START stage 610 and may be initiated by an internal battery signal generated by battery or external electronics or by a user actuation, such as through battery test switch 140 (as shown in FIG. 1) actuation or via an internal battery condition signal such as predefined charge states, connection/disconnection from a tool or charger, or via other user-initiated or automatic actions. At stage 620, a determination may be made regarding whether the battery charge is at a predetermined maximum value or above a limit or threshold value. If the determination is YES, execution may condition to stage 622, where a predefined full or above-threshold stage signal scheme is initiated. This may be, for example, the same as or similar to that shown in the legends of FIGS. 2C and 3B, with a first LED, such as a green LED, illuminated with a 100 percent duty cycle or at a full amplitude, and a second LED, such as a red LED, turned off.

Alternately, if the battery charge stage is determined to be less than full at stage 620, execution may continue to stage 630, where a determination as to whether the charge state is empty or below a predefined lower threshold. If the charge state is below the predefined threshold or empty at stage 630, execution may continue to stage 632, where a display indicating fully discharged or below threshold may be executed with the two LEDs. For example, a lighting sequence similar to that provided at stage 622 may be provided at stage 632, with the red and green light displays reversed. Other embodiments with a distinct lighting sequence corresponding to a discharged or empty charge state may also be provided at stage 632.

It is noted that paired stages 620-622 and 630-632 may be reversed in execution in some embodiments while providing the same effective result on the displays.

If the battery charge stage is between the full or upper threshold and discharged or lower threshold, execution may continue to stage 640. At this stage, a unique lighting display using two (or more) lighting elements, such as a red and a green LED, may be provided, with this intermediate charge stage light sequence corresponding with a battery charge stage between full and empty or discharged. This sequence may, for example, be a sequence the same as or similar to that shown in FIGS. 2C and 3B, or as shown in FIGS. 8-12, described subsequently herein. Process 600 may then terminate at stage 650 after the particular display is provided for a predetermined time interval such as, for example, 1 second, 5 seconds, 10 seconds, or another predefined time interval. Alternately, the display process 600 may be repeated or may be triggered or terminated by another condition or input, such as a user provided input, an internal trigger signal provided from the battery electronics or based on connection or disconnection with a tool or charger, or based on other conditions, signals, or physical parameters associated with the battery pack or its operating environment.

Figure 7:
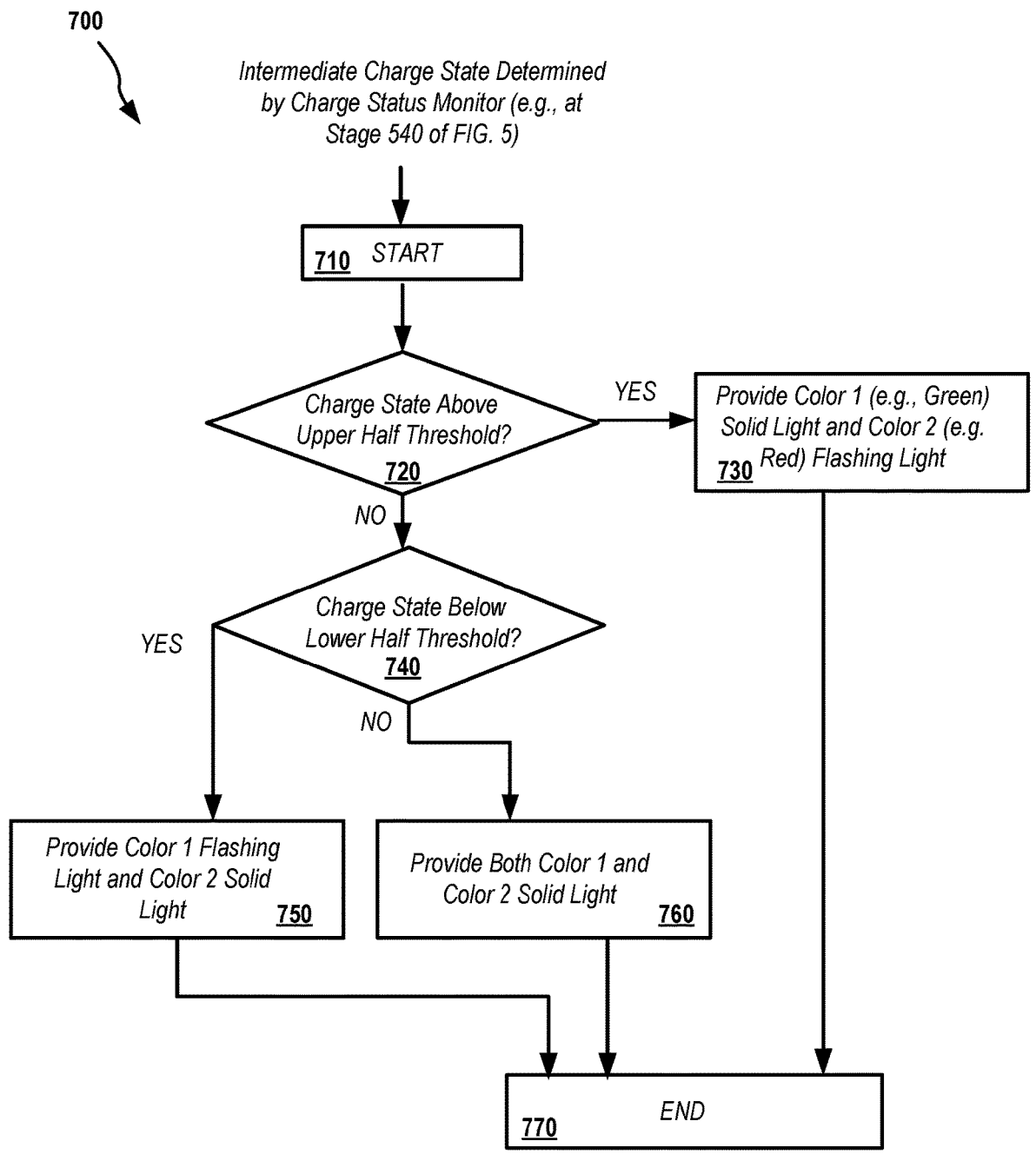
FIG. 7 illustrates details of an embodiment of a process for controlling lighting in conjunction with a process embodiment such as shown in FIG. 5.

FIG. 7 illustrates details of an embodiment of a method/process 700. Process 700 may be used in conjunction with process 500 of FIG. 5, or process 600 of FIG. 6, or with other processes to provide an intermediate charge state display. Process 700 may be used to provide different sequences based on three different intermediate charge states, first, if the charge is below full but above a mid-charge threshold or upper half threshold, which may be defined by an intermediate charge state threshold or range, a sequence with a first lighting element solid (e.g., a green LED) and a second lighting element (e.g., a red LED) flashing, with the flashing rate, duty cycle, amplitude, frequency, or other parameter being proportional to the amount of charge between half and full. In a second intermediate charge state, within a predetermined band about the mid-charge (or other predefined intermediate state) both lighting element will be on at a 100 percent duty cycle (or alternately flashing at the same rate, same duty cycle, same frequency, sample amplitude, etc.). At the third charge state, below the mid-charge band (in a lower half threshold or below the mid-charge band), a sequence with the first lighting element flashing (e.g., a green LED) and the second lighting element (e.g., a red LED) solid, with the flashing rate, duty cycle, amplitude, frequency, or other parameter being proportional to the amount of charge between half and empty.

For example, execution may begin at stage 710, and may transition to stage 710 at stage 540 of FIG. 5 so as to provide a particular lighting sequence on two or more lighting elements, such as two LEDs, based on the intermediate charge state (i.e., above upper half threshold, mid-charge, or below lower half threshold). At stage 720, a determination may be made as to whether the charge state is above the upper half threshold (or another intermediate charge state in alternate embodiments). If the charge state is above the half charged threshold, execution may continue to stage 730, where the first colored LED is displayed as solid, and the second colored LED is flashing (or otherwise varied, e.g. by flashing rate, duty cycle, amplitude, frequency, or other parameter being proportional to the amount of charge between half and full). If the charge state at stage 720 is not above the upper half threshold, execution may continue to stage 740, where a determination of whether the charge state is below the lower half threshold may be made. If the charge state is below the lower half threshold, execution may continue to stage 750, with first and second LED displays reversed or otherwise varied from the display provided at stage 730. Alternately, if the charge stage is in the mid-range (between the upper and lower half thresholds), both LEDs may be provided as solid, 100 percent duty cycle, or otherwise having the same frequency, duty cycle, amplitude, or other common parameters. In some embodiments, the middle charge state band (as displayed at stage 760) may be omitted and the charge state determination be made solely on whether the charge state is above or below a mid-charge threshold (e.g., by omitting one of stages 720 and 740). In other embodiments, more intermediate states may be used, with corresponding additional decision stages in addition to stages 720 and 740 included.

Process 700 may end at stage 770, such as, for example, by terminating or by returning execution to another process such as process 500, stage 560, as shown in FIG. 5. In an exemplary embodiment of process 700, the LEDs are colored green and red, with green providing an indication of remaining charge and red providing an indication of used or depleted charge.

Figure 8:
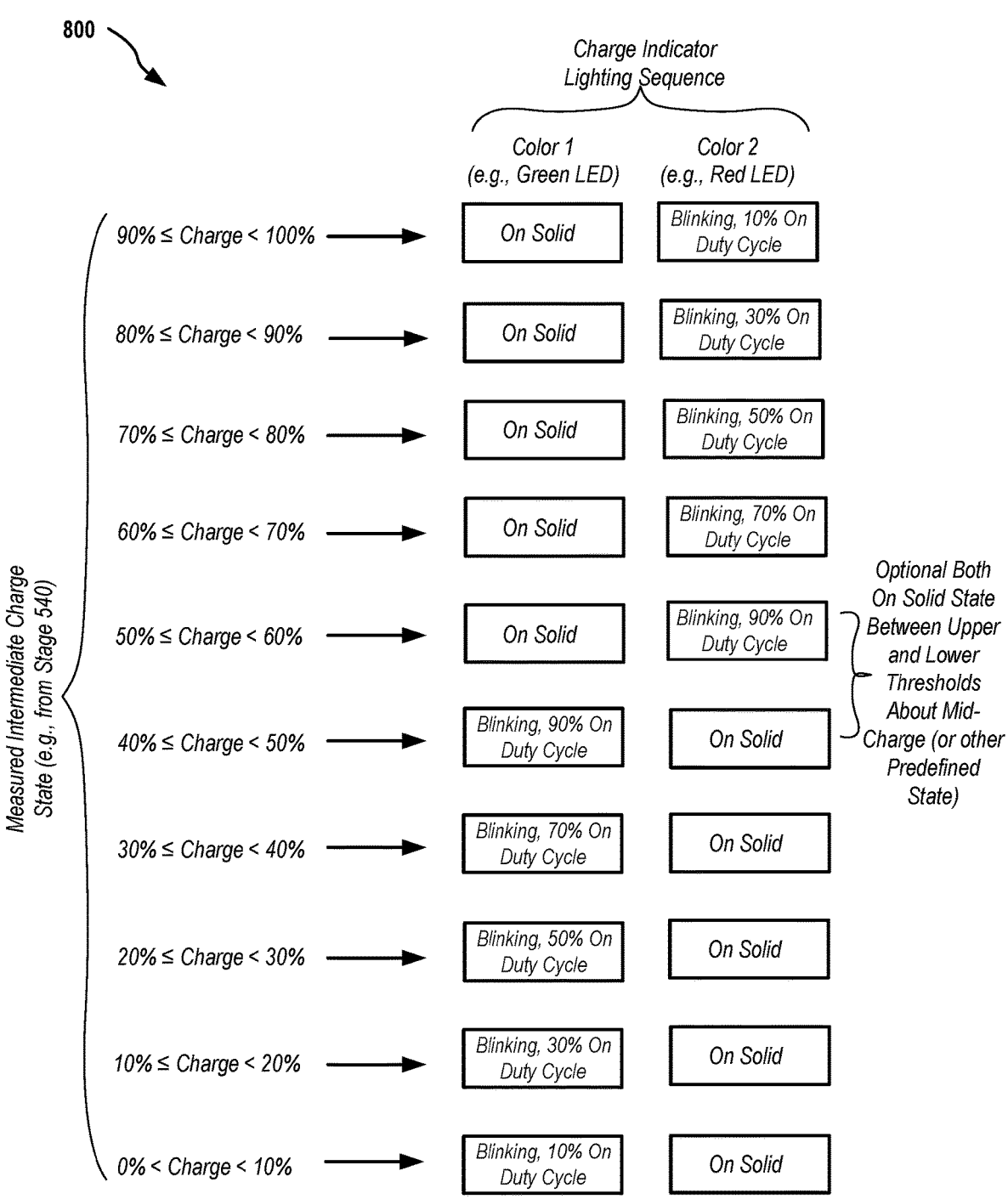
FIG. 8 shows a chart with details of one embodiment of a lighting sequence representing charge state as presented by two differently colored lights such as LEDs.

In this way, a user can determine the relative charge over a range of charge values, with those above a predefined threshold (e.g., half charge) reflected in solid green, and those below the threshold reflected in solid red. Other colors and/or additional numbers of lighting elements may be used in alternate embodiments. For example, the chart of FIG. 8 illustrates details of lighting colors, duration, and blinking or flashing for such an embodiment. Within predefined charge bands or thresholds as shown on the left of chart 800 (e.g., 90-100% charge, 80-90% charge, etc.) the first color light (e.g., green) may be fully on as seen visually by a user, while a second color light (e.g., red) may be blinking or otherwise cycled, such as based on a duty cycle as a function of discharge. In this example lighting sequence as a function of charge, as the charge decreases from fully charged (at the top of the chart 800), the color 1 (green) light remains on in a solid or steady mode while the second light (red) is flashed, strobed, or otherwise varied with a flash rate, duty cycle, or other changing variable at a rate corresponding to the amount of discharge from full. In this example embodiment, the duty cycle of the second light increases as the charge decreases from full to half (or another intermediate threshold), and then is driven in a fully on or steady mode while the first light is switched to a flashing, variable duty cycle, or other variable lighting mode.

Figure 9A:
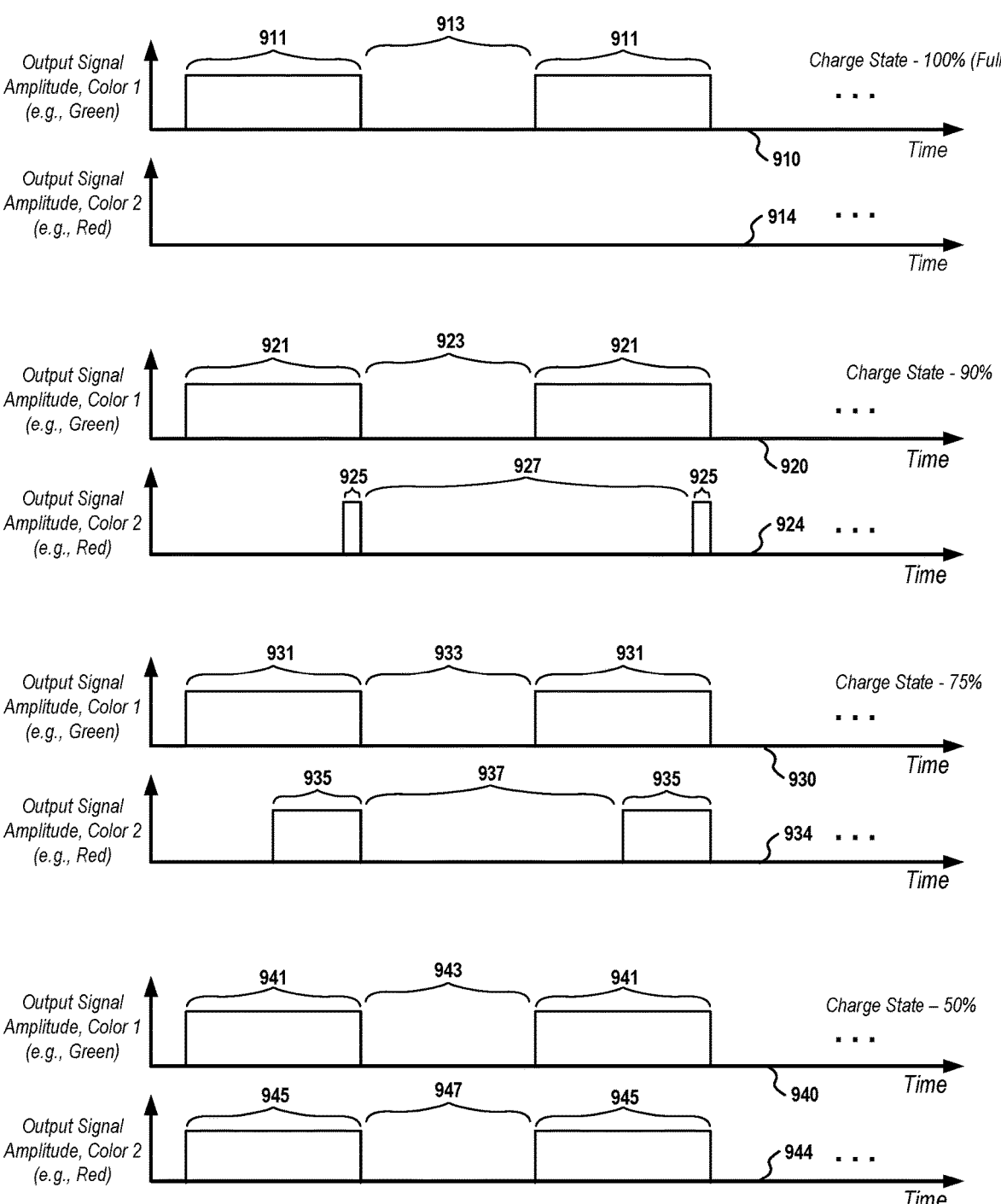
FIGS. 9A and 9B illustrate timing details for an embodiment of a lighting sequence using two differently colored LEDs to represent charge state.
Figure 9B:
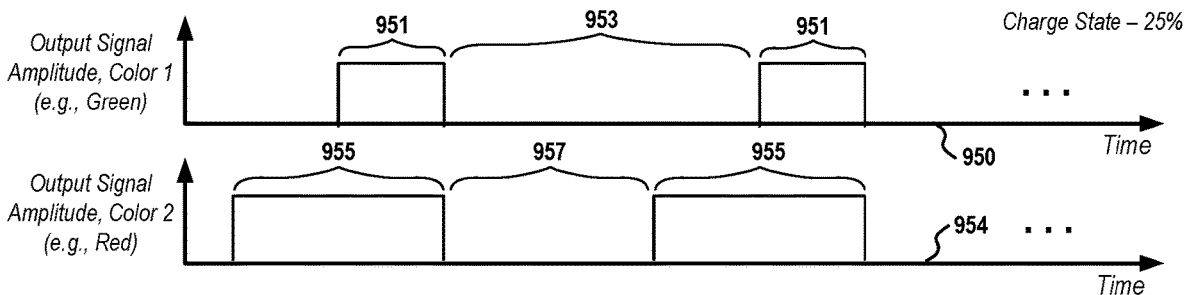
Figure 9B:
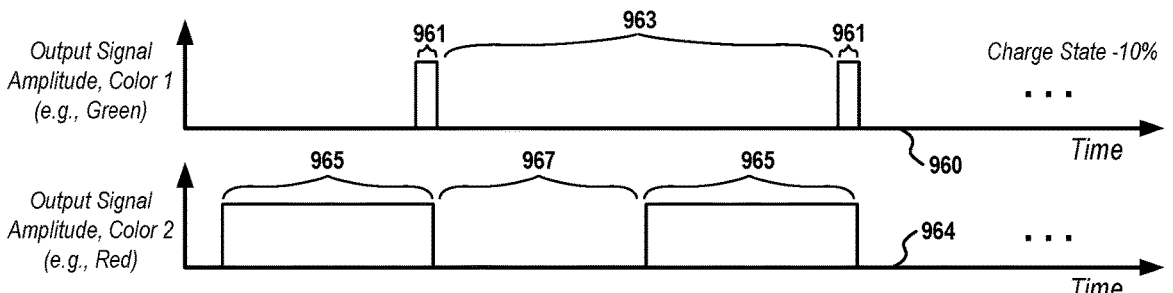
Figure 9B:
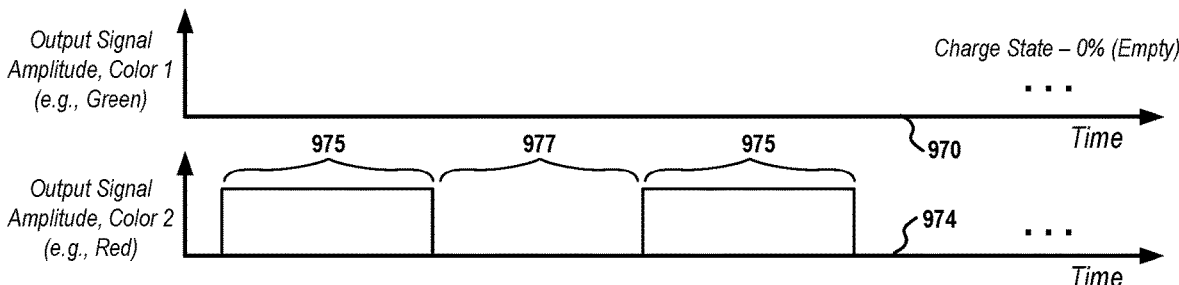

FIGS. 9A and 9B illustrate example alternate timing diagrams with duty cycles for two different colored lights (red and green in this example, but these can be other colors and/or additional lighting elements in alternate embodiments). The diagrams of FIGS. 9A and 9B illustrate varying duty cycles of two light sequences, both of which are flashing in this embodiment, as a function of charge state.

Figure 10A:
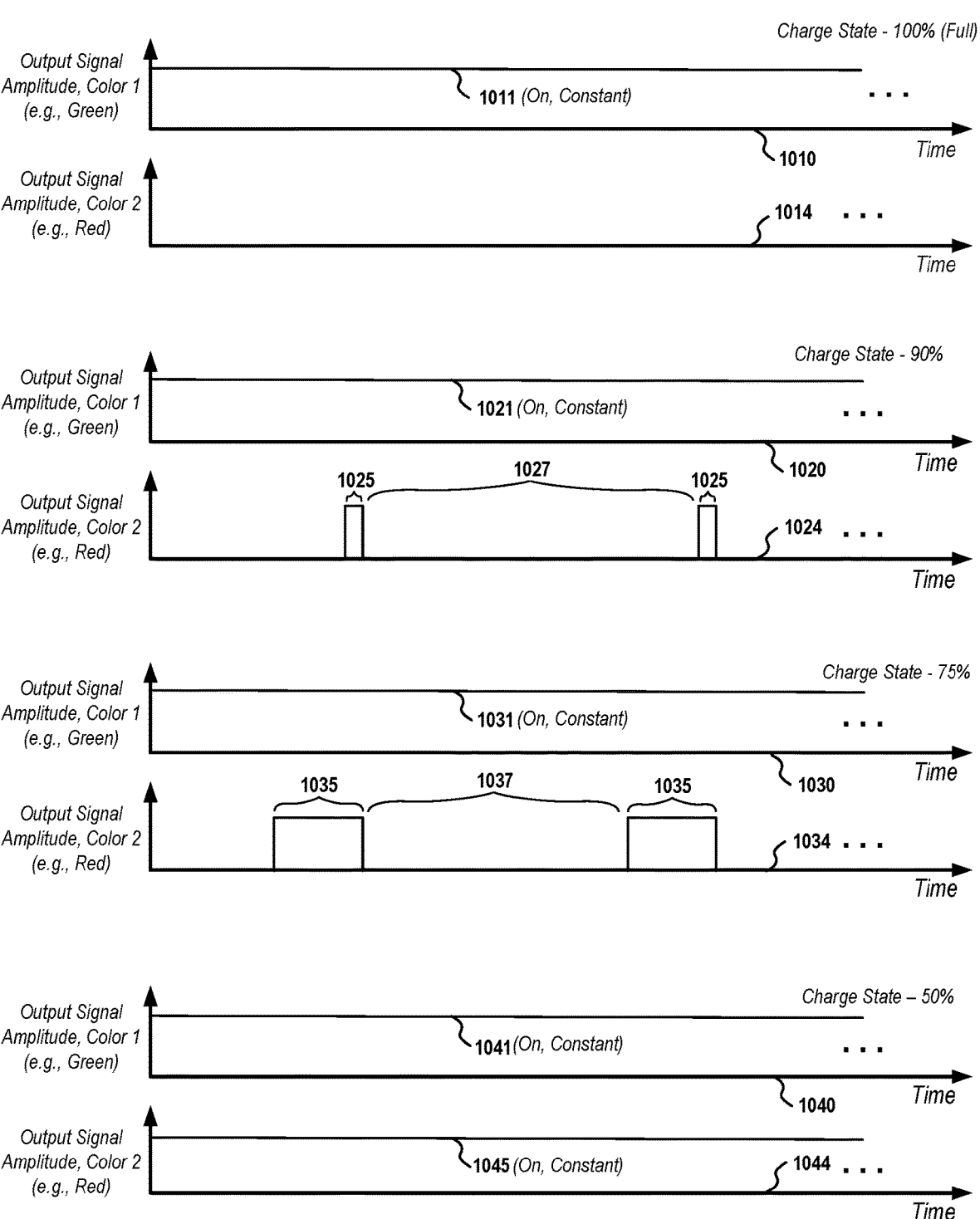
FIGS. 10A and 10B illustrate timing details for another embodiment of a lighting sequence using two differently colored LEDs to represent charge state.
Figure 10B:
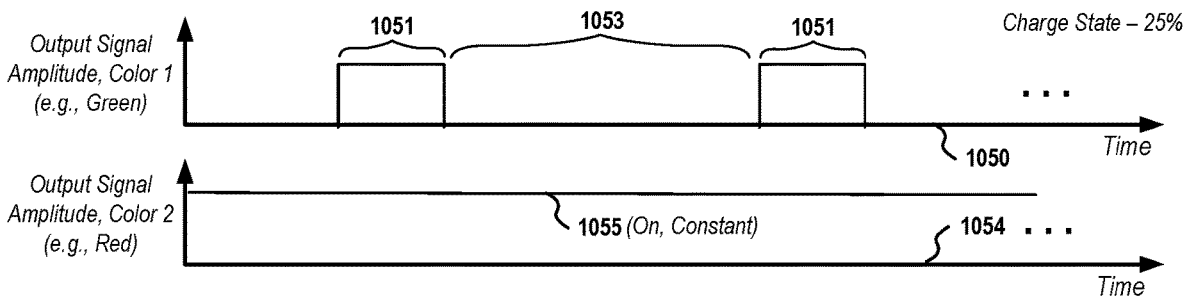
Figure 10B:
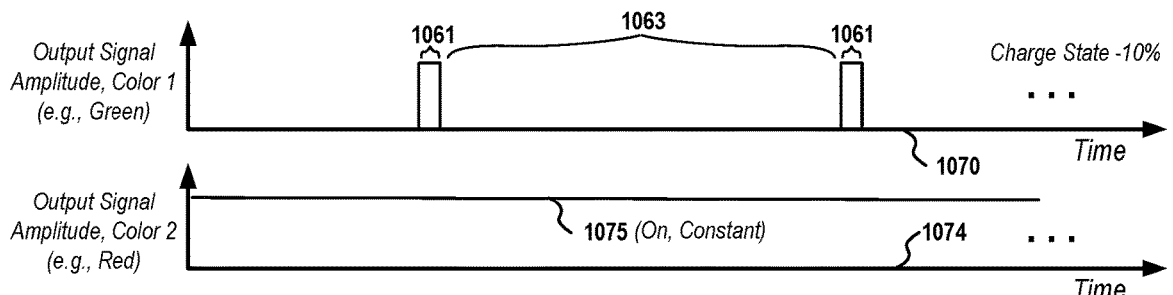
Figure 10B:
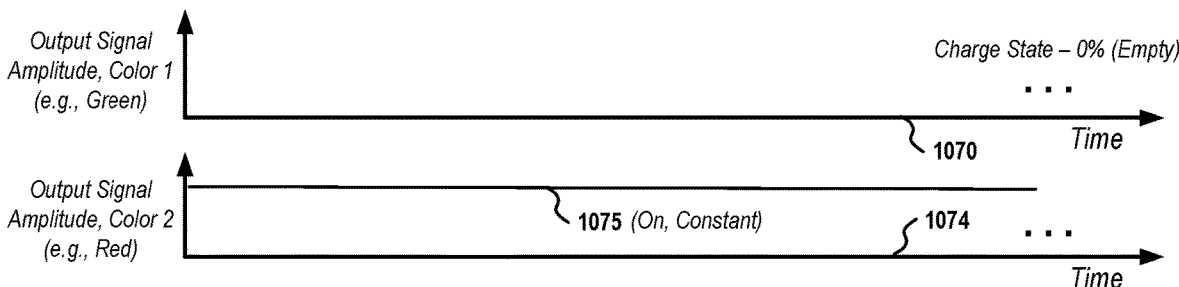
Figure 11:
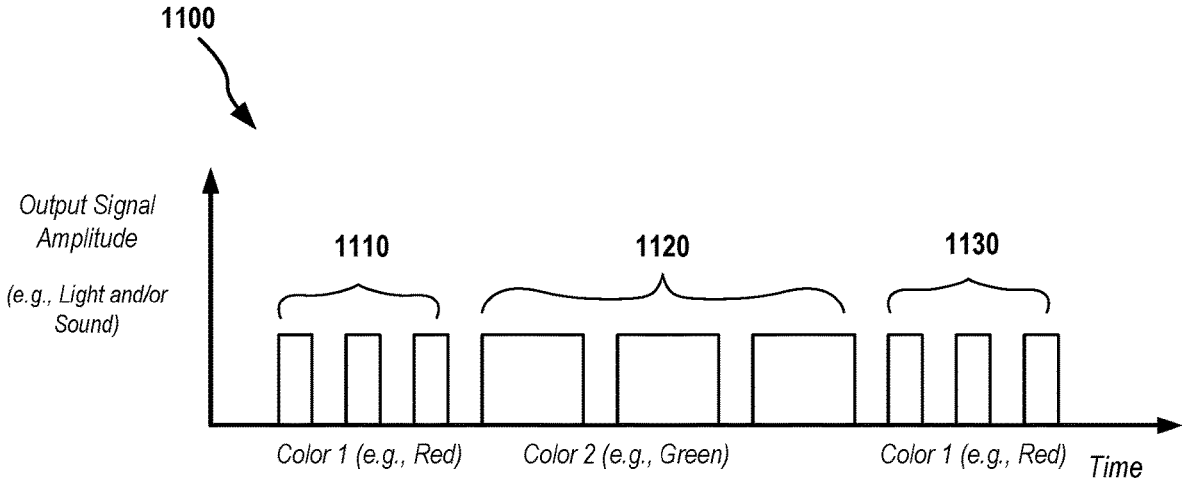
FIG. 11 illustrates details of one embodiment of a failure mode lighting sequence than may be provided visually on one or more lighting elements of a battery pack.
Figure 12:
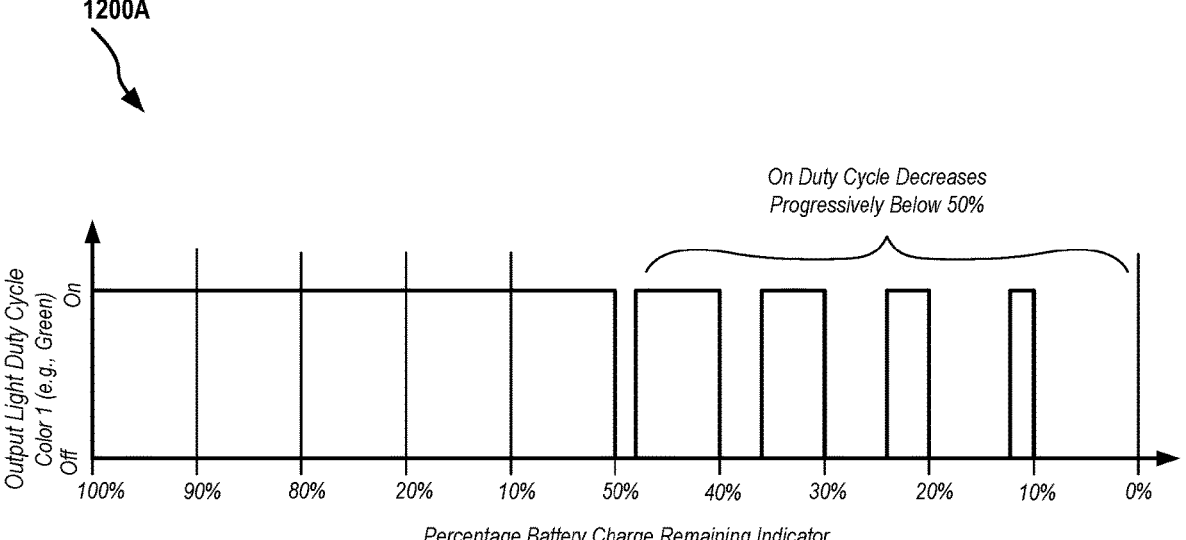
FIG. 12 illustrates details of a duty-cycle proportional lighting sequence embodiment for driving lighting elements at charge state above and below a predefined intermediate charge state such as half-charged.
Figure 12:
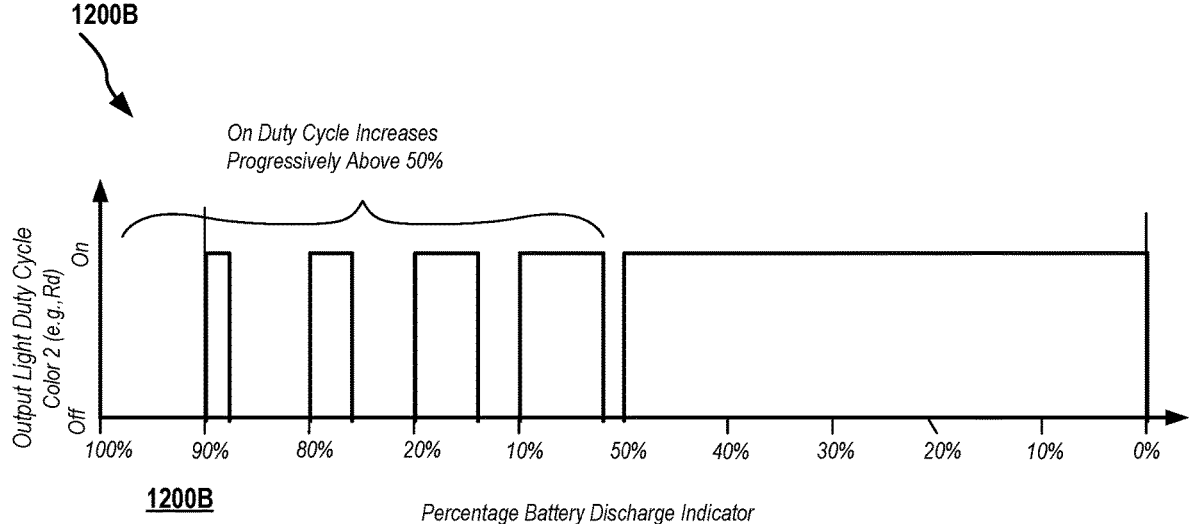

FIGS. 10A and 10B illustrate another example timing diagram, in this case corresponding with illumination of a first lighting element (e.g., a green LED) in a fully on state above a predefined intermediate threshold such as half charged, and a second lighting element fully on below the predefined intermediate threshold. Within a mid-charge threshold, both lights may be fully on in some embodiments (as shown in FIG. 10A). Alternately, either the first or second light, but not both, may be fully turned on in alternate embodiments. Additional details of corresponding duty cycles are shown in FIG. 12, with the green light fully on above a half charged intermediate charge state and the red light fully on below the half charged intermediate charge state. The other light in both cases is flashes, duty cycle modulated, or otherwise varied, proportionally to the current charge state (either while the battery is in use or in a stored state, such as when a user wishes to see the current charge state before use).

Additional light code patterns can be used in various embodiments. For example, a distinct failure code pattern may be used by providing the pattern on two or more of the lighting elements, where the failure code pattern is distinct from any normal charge state pattern. In one embodiments, the failure code pattern may be a Morse Code SOS pattern, i.e., a sequence of flashes or other varying light patterns that are based on or represent the Morse Code " . . . _ _ _ . . . " pattern. An example of an error code sequence is shown in the timing diagram of FIG. 11, where the familiar Morse Code SOS pattern is shown. Other error code patterns may be used in alternate embodiments. Error conditions may be sensed by electronic circuits that monitor battery cells or other aspects of battery pack operation, such as for voltage or current anomalies, charge/discharge problems, or other error conditions. For example, the processing element 134 as shown in FIG. 1 may receive charge state data from charge circuit 132 and/or other sensor data from additional sensors (not shown) that may be used to determine a battery pack failure, cell failure, or other problem condition.

In some embodiments, multicolor LEDs may be used in place of or in addition to fixed color (e.g., red, green) LEDs. Multicolor LEDs may be used in embodiments for providing more than two discrete colors (e.g., red and green) so as to provide multiple colors and/or shades of colors to provide charge state or other information. For example, the red and green (or other paired colored) LEDs described previously herein in various embodiments may be replaced with a pair (or more) multicolor LEDs. Such multicolor LED embodiments may include associated electronics to control the output lighting color in accordance with a predefined pattern such as those described subsequently herein. For example, embodiments using red, green, and blue LEDs may include associated electronics to provide a range of colors corresponding to particular charge states and/or may provide binary or continuous color variations such as blinking between colors, one or multiple color flashing, and the like.

Details of one example multicolor LED lighting sequence embodiment are shown below, where a pair of multicolor LEDs, with a first of the multicolor LEDs corresponding to the exemplary green LED described previously herein, and a second of the multicolor LEDs corresponding to the exemplary red LED described previously. The multicolored LEDs may be mounted on a battery back in the same way the red and green LEDs 270-1 and 270-2 are mounted in the embodiment shown in FIG. 2A. In this alternate multicolor LED embodiment, rather than having the LEDs blink, flash, or otherwise be modulated during part of the discharge cycle, the color or colors may be varied. The color variation may be shown on a label or other indicator on the battery in a similar fashion to legend 285 as shown in FIG. 2B. An example sequence is shown below, reflecting color changes of the two multicolor LEDs when the battery charge state goes from fully charged (at the top) to fully discharged (at the bottom). The lighting sequence can represent, for example, progressive changes from LED 1 to LED 2, wherein LED 2 changes first to a lower charge state color, with LED then changing to that color as the battery becomes further discharged. Various other sequences and colors may also be used in alternate embodiment to indicate multiple discharge state levels as the battery charge state decreases (or, in charging cycles, as the battery charge state increases).

TABLE 1

| Example Multicolor LED Charge State Sequence | | |
| --- | --- | --- |
| Multicolor LED 1 | Multicolor LED 2 | |
| Blue | Blue | (Full Charge) |
| Blue | Green | |
| Green | Green | |
| Green | Yellow | |
| Yellow | Yellow | |
| Yellow | Red | |
| Red | Red | (Full Discharge) |

In addition to color changes as described above, additional lighting parameters, such as, for example, fade-in, fade-out, flashing or duty cycle modulation may also be combined with light color changes. For example, modulation as described previously with respect to the two LED embodiments with red and green lights may be combined with lighting color changes above in some embodiments. Details of an example embodiment lighting segment of such a configuration are shown below in Table 2, where the charge state decreases from full charge at the top to full discharge at the bottom and the LEDs may blink on and off, or between different colors (as shown in the "/") during certain states.

TABLE 2

Another Example Multicolor LED Charge State Sequence

| Multicolor LED 1 | Multicolor LED 2 | |
| --- | --- | --- |
| Green | Green | (Full Charge) |
| Green | Green/Yellow | |
| Green/Yellow | Green/Yellow | |
| Green/Yellow | Yellow | |
| Yellow | Yellow | |
| Yellow | Yellow/Orange | |
| Yellow/Orange | Orange | |
| Orange | Orange | |
| Orange | Orange/Red | |
| Orange/Red | Red | |
| Red | Red | |
| Red | Red | (Near Full Discharge) |
| Red/Red | Red/Red | (Blink Before Off) |

In some embodiments, specific colors, flash sequences, fade in/out sequences, and the like may be used to indicate particular battery states. For example, Blue, or a flashing Blue/Red or other color combination, may be provided on the LEDs to indicate a fail state or other pre-defined state, such as a particular number of charge/discharge cycles, battery parameters such as temperature, moisture, pressure, and the like. In addition to color changes as described above, additional lighting parameters, such as, for example, fade-in, fade-out, blinking or other modulation sequences, or other lighting parameter changes may be combined with the varying lighting sequences above in some embodiments to provide specific details or more granular charge state detail.

In some embodiments, data or code transfer between a battery and a connected device, such as, for example, is described in co-assigned U.S. Pat. No. 10,090,498, entitled MODULAR BATTERY PACK APPARATUS, SYSTEMS, AND METHODS INCLUDING VIRAL DATA AND/OR CODE TRANSFER, may be indicated or signaled using LEDs and associated sequences as described herein. For example, in an exemplary embodiment, a particular color combination, flash sequence, or other modulation may be used to indicate code or data has been loaded to the battery, with another color combination, flash sequence, or other modulation used to indicate code or data download. For example, in one embodiment, a combination of Blue and Green LEDs may be used on an LED pair to indicate that code or data has successfully been uploaded to the battery, and Blue and Red LEDs may be used in a pair to signal download of code or data. Alternate embodiments may use various other combinations of LED colors, blinking or flashing sequences, color changes, and/or other modulation to indicate particular battery states, operations (e.g., code or data transfer) or other data or information.

In some configurations, the apparatus and systems described herein may include means for implementing features or providing functions described herein. In one aspect, the aforementioned means may be a module including a processor or processors in one or more processing elements, associated non-transitory memory and/or other electronics in which embodiments of the invention reside, such as to implement utility locator transmitter functions, utility locator functions, magnetic dipole sondes, induction sticks, utility designators/selectors, digital data encoding and decoding modules, image and/or video signal processing, and/or providing other electronic functions described herein. These may be, for example, modules or apparatus residing in transmitters, locators, CCUs, sondes, or other locate system devices.

In one or more exemplary embodiments, the electronic functions, methods and processes described herein and associated with utility locator transmitters, locators, utility type designators, sondes, CCUs, camera heads, and the like may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to locators, transmitters, sondes, utility designators, CCUs, camera heads, and other system devices may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two, which may be implemented in one or more processing elements. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited only to the aspects shown herein but is to be accorded the widest scope consistent with the appended Claims and their equivalents.

We claim:

1. A buried utility locator, comprising:
an AC magnetic field sensing locator for determining position information for one or more hidden or buried utilities; and
a battery pack removably coupled to the locator for providing power thereto, the battery pack comprising:

a housing including a mechanical attachment mechanism for removably coupling the battery pack to the locator;
a rechargeable battery cell assembly positioned within the housing;
an electrical power and charging connector assembly for electrically coupling the battery cell terminals to the locator and to a battery charger;
an electronic circuit operatively coupled to the battery cell assembly, including:
a battery charge state monitoring circuit for receiving a signal associated with a charge state of the battery cell assembly and generating a charge state status output;
a lighting element driver circuit; and
an output display element, including two or more differently colored lighting elements, operatively coupled to the driver circuit such that the lighting elements provide:
when the battery charge state is above a predefined intermediate charge state threshold, a first steady light output signal from a first of the colored lighting elements and a first varying light output signal from a second of the colored lighting elements, wherein the first varying light output signal reflects a decrease from a fully charged state of the battery cell assembly when the battery charge state is above a predefined intermediate charge state threshold; and
when the battery charge state is below the predefined intermediate charge state threshold, a second varying light output signal from the first of the colored lighting elements and a first steady light output signal from the second of the colored lighting elements, wherein the second varying light output signal reflects a decrease from a fully charged state of the battery cell assembly when the battery charge state is below the predefined intermediate charge state threshold; and
wherein the varying light output signals are duty-cycle modulated signals, wherein the duty-cycle is proportionate with a current charge state of the battery pack.

2. The locator of claim 1, wherein the two or more differently colored lighting elements include a green lighting element as the first of the colored lighting elements and a red lighting element as the second of the colored lighting elements.

3. The locator of claim 2, wherein the red and green lighting elements are light emitting diodes (LEDs).

4. The locator of claim 3, wherein the predefined intermediate charge threshold is a half charged state.

5. The locator of claim 1, wherein the varying light output signals are flashing rate of the flashing sequences is proportional to a current charge state of the battery pack.

6. The locator of claim 3, wherein a failure mode code pattern is provided from one or more of the lighting elements when a battery pack failure mode is sensed.

7. The locator of claim 4, wherein the failure mode code pattern is a Morse Code SOS pattern.

8. The locator of claim 5, further including a charge state legend on the battery pack housing, wherein the charge state legend illustrates the charge state presented by the colored lighting elements as a function of battery charge.

9. The locator of claim 6, wherein the legend illustrates the charge state in solid segments and oval segments corresponding to the display output of the multicolored lighting elements.

10. The locator of claim 1, wherein the battery pack further includes electronics for transferring data between the battery pack and the locator, and wherein the data transfer is presented by a display sequence on the colored lighting elements.

\* \* \* \* \*